US009804423B2

(12) United States Patent
Reano et al.

(10) Patent No.: US 9,804,423 B2
(45) Date of Patent: Oct. 31, 2017

(54) ON-CHIP OPTICAL POLARIZATION CONTROLLER

(71) Applicant: OHIO STATE INNOVATION FOUNDATION, Columbus, OH (US)

(72) Inventors: Ronald M. Reano, Columbus, OH (US); Peng Sun, Carlsbad, CA (US); Qiang Xu, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 14/770,291

(22) PCT Filed: Feb. 24, 2014

(86) PCT No.: PCT/US2014/018036
§ 371 (c)(1),
(2) Date: Aug. 25, 2015

(87) PCT Pub. No.: WO2014/130950
PCT Pub. Date: Aug. 28, 2014

(65) Prior Publication Data
US 2016/0011438 A1 Jan. 14, 2016

Related U.S. Application Data

(60) Provisional application No. 61/768,828, filed on Feb. 25, 2013.

(51) Int. Cl.
*G02F 1/136* (2006.01)
*G02F 1/01* (2006.01)
(Continued)

(52) U.S. Cl.
CPC ....... *G02F 1/0136* (2013.01); *G02B 6/12002* (2013.01); *G02B 6/126* (2013.01);
(Continued)

(58) Field of Classification Search
None
See application file for complete search history.

(56) References Cited

U.S. PATENT DOCUMENTS

| 8,442,368 | B1 | 5/2013 | Reano et al. |
| 8,494,318 | B2 * | 7/2013 | Bolla ............. G02B 6/12007 385/27 |
| 2010/0183312 | A1 | 7/2010 | Bolla et al. |

OTHER PUBLICATIONS

International Search Report and Written Opinion of the U.S. International Searching Authority from Application No. PCT/US2014/018036, dated May 23, 2014.

(Continued)

*Primary Examiner* — Tina Wong
(74) *Attorney, Agent, or Firm* — Meunier Carlin & Curfman LLC

(57) ABSTRACT

An example optical polarization controller can include a substantially planar substrate and a waveguide unit cell formed on the substantially planar substrate. The waveguide unit cell can include a first out-of-plane waveguide portion and a second out-of-plane waveguide portion coupled to the first out-of-plane waveguide portion. Each of the first and second out-of-plane waveguide portions can respectively include a core material layer arranged between a first optical cladding layer having a first stress-response property and a second optical cladding layer having a second stress-response property. The first and second stress-response properties can be different such that each of the first and second out-of-plane waveguide portions is deflected by a deflection angle.

9 Claims, 15 Drawing Sheets

(51) Int. Cl.
G02B 6/35 (2006.01)
G02B 6/12 (2006.01)
G02B 6/126 (2006.01)
G02B 6/136 (2006.01)
G02B 6/293 (2006.01)
G02F 1/025 (2006.01)

(52) U.S. Cl.
CPC .......... *G02B 6/136* (2013.01); *G02B 6/2934* (2013.01); *G02B 6/3504* (2013.01); *G02B 6/3596* (2013.01); *G02F 1/0147* (2013.01); *G02F 1/025* (2013.01); *G02F 2201/06* (2013.01); *G02F 2202/10* (2013.01)

(56) References Cited

OTHER PUBLICATIONS

T. Barwicz, M. R. Watts, M. A. Popovi, P. T. Rakich, L. Socci, F. X. Kaertner, E. P. Ippen, and H. I. Smith, "Polarization-transparent microphotonic devices in the strong confinement limit," Nature Photonics 1, 57-60 (2006).
M. V. Berry, "Quantal phase factors accompanying adiabatic changes," Proceedings of the Royal Society of London. Series A, Mathematical and Physical Sciences 392, 45-57 (1984).
K. Y. Bliokh, A. Niv, V. Kleiner, and E. Hasman, "Geometrodynamics of spinning light," Nature Photonics 2, 748-753 (2008).
R. Y. Chiao and Y. S. Wu, "Manifestations of Berry's topological phase for the photon," Physical Review Letters 57, 933-936 (1986).
Fukuda, K. Yamada, T. Tsuchizawa, T. Watanabe, H. Shinojima, and S. Itabashi, "Polarization rotator based on silicon wire waveguides," Optics Express 16, 2628-2635 (2008).
H. Fukuda, K. Yamada, T. Tsuchizawa, T. Watanabe, H. Shinojima, and S. Itabashi, "Silicon photonic circuit with polarization diversity," Optics Express 16, 4872-4880 (2008).
S.-H. Kim, R. Takei, Y. Shoji, and T. Mizumoto, "Single-trench waveguide TE-TM mode converter," Optics Express 17, 11267-11273 (2009).
F. Martin, P. Muralt, M.-A. Dubois, and A. Pezous, "Thickness dependence of the properties of highly c-axis textured AIN thin films," Journal of Vacuum Science and Technology A: Vacuum, Surfaces, and Films 22, 361-365 (2004).
S. Pancharatnam, "Generalized Theory of Interference, and Its Applications. Part I. Coherent Pencils". Proceedings Indian Academy of Science A 44, 247-262 (1956).
G. Reed, G. Mashanovich, W. Headley, B. Timotijevic, F. Gardes, S. Chan, P. Waugh, N. Emerson, C. Png, M. Paniccia, A. Liu, D. Hak, and V. Passaro, "Issues associated with polarization independence in Silicon Photonics," Journal of Selected Topics in Quantum Electronics 12, 1335-1344 (2006).
P. Sun and R. M. Reano, "Cantilever couplers for intra-chip coupling to silicon photonic integrated circuits," Optics Express 17, 4565-4574 (2009).
C. Vinegoni, M. Karlsson, M. Petersson, and H. Sunnerud, "The statistics of polarization-dependent loss in a recirculating loop," Journal of Lightwave Technology 22, 968-976 (2004).
S. Wilson et al. "New materials for microscale sensors and actuators: An engineering review," Material Science and Engineering R: Reports 56, 1-129 (2007).
P. Chan, H. Tsang, and C. Shu, "Mode conversion and birefringence adjustment by focused-ion-beam etching for slanted rib waveguide walls," Optics Letters, vol. 28, 2109-2111 (2003).
N.-N. Feng, R. Sun, J. Michel, and L. C. Kimerling, "Low-loss compact-size slotted waveguide polarization rotator and transformer," Optics Letters, vol. 32, 2131-2133 (2007).
J. Hannay, "Angle variable holonomy in adiabatic excursion of an integrable Hamiltonian," Journal of Physics A , vol. 18, 221-230 (1985).
M. Ishihara, S. J. Li, Y. Yumoto, K. Akashi, and Y. Ide, "Control of preferential orientation of AIN films prepared by the reactive sputtering method," Thin Solid Films, vol. 316, 152-157 (1998).
B. M. A. Rahman, S. S. A. Obayya, N. Somasiri, M. Rajarajan, K. T. V. Grattan, and H. A. El-Mikathi, "Design and Characterization of Compact Single-Section Passive Polarization Rotator," Journal of Lightwave Technology, vol. 19, 512-519 (2001).
P. Senthilkumaran, B. Culshaw, and G. Thursby, "Fiber-optic Sagnac interferometer for the observation of Berry's topological phase," Journal of the Optical Society of America B, vol. 17, 1914-1919 (2000).
M. R. Steel, F. Harrison, and P. G. Harper, "The piezoelectric bimorph: An experimental and theoretical study of its quasistatic response," Journal of Physics D: Applied Physics, vol. 11, 979-989 (1978).
A. Tomita and R. Y. Chiao, "Observation of Berry's topological phase by use of an optical fiber," Physical Review Letters, vol. 57, 937-940 (1986).
F. Wassmann and A. Ankiewicz, "Berry's phase analysis of polarization rotation in helicoidal fibers," Applied Optics, vol. 37, 3902-3911 (1998).
X.-H. Xu, H.-S. Wu, C.-J. Zhang, and Z.-H. Jin, "Morphological properties of AIN piezoelectric thin films deposited by DC reactive magnetron sputtering," Thin Solid Films, vol. 388, 62-67 (2001).
Y. Yue, L. Zhang, M. Song, R. G. Beausoleil, and A. E. Willner, "Higher-order-mode assisted silicon-on-insulator 90 degree polarization rotator," Optics Express, vol. 17, 20694-20699 (2009).

* cited by examiner

ON-CHIP OPTICAL POLARIZATION CONTROLLER

CROSS-REFERENCE TO RELATED APPLICATIONS

This application claims the benefit of U.S. Provisional Patent Application No. 61/768,828, filed on Feb. 25, 2013, entitled "BROADBAND AND TUNABLE ON-CHIP OPTICAL POLARIZATION ROTATOR," the disclosure of which are expressly incorporated herein by reference in its entirety.

STATEMENT REGARDING FEDERALLY FUNDED RESEARCH

This invention was made with Government support under Grant No. 1102246 awarded by the National Science Foundation. The Government has certain rights in the invention.

BACKGROUND

One of the major open challenges for high confinement silicon photonic integrated circuits is to achieve polarization independence. Large polarization mode dispersion ("PMD"), polarization dependent loss ("PDL"), and polarization dependent wavelength characteristics are caused by structural birefringence in silicon strip waveguides. Polarization independent photonic integrated circuits may be achieved by using a silicon waveguide core that is exactly square in shape. In reality, however, fabrication errors of only a few nanometers would result in significant birefringence. Quantitatively, for example, given a waveguide cross section of 300 nm×300 nm, a variation of ±5 nm in width results in a differential group delay of 7 ps over a 5 cm length. Consequently, a 40 Gbps high-speed data stream would be significantly degraded under such conditions. Furthermore, the waveguide core width and height fluctuate randomly along the direction of light propagation due to fabrication tolerances. The random fluctuation varies the group index and results in polarization dependent wavelength characteristics of wavelength filters. Quantitatively, transverse-electric ("TE") and transverse-magnetic ("TM") modes exhibit a 100 GHz difference in resonance frequency in a 10 micrometer radius ring resonator with a 1 nm variation in waveguide width. Extremely challenging nanometer accuracy is therefore required for silicon strip waveguide devices used in polarization-independent dense wavelength division multiplexing systems.

To achieve polarization independent photonic integrated circuits, devices and architectures that attempt to rotate and control optical polarization have been pursued. These devices and architectures are referred to as systems with polarization diversity (or polarization transparency). These approaches include asymmetric gratings, waveguides with asymmetric slanted sidewalls, dual core waveguides with asymmetric axes, waveguides with asymmetric trenches, triple waveguide couplers, and bi-layer slots. Y. Yue et al., "Higher-order-mode assisted silicon-on-insulator 90 degree polarization rotator," Optics Express 17, 20694-20699 (2009). S.-H. Kim et al., "Single-trench waveguide TE-TM mode converter," Optics Express 17, 11267-11273 (2009). H. Fukuda et al., "Polarization rotator based on silicon wire waveguides," Optics Express 16, 2628-2635 (2008). N.-N. Feng et al., "Low-loss compact-size slotted waveguide polarization rotator and transformer," Optics Letters 32, 2131-2133 (2007). B. M. A. Rahman et al., "Design and Characterization of Compact Single-Section Passive Polarization Rotator," Journal of Lightwave Technology 19, 512- (2001). P. Chan et al., "Mode conversion and birefringence adjustment by focused-ion-beam etching for slanted rib waveguide walls," Optics Letters 28, 2109-2111 (2003). These approaches to realize polarization rotators in silicon suffer from several drawbacks. First, these approaches are static, in the sense that they rotate the polarization by only a fixed amount. Rotation angles vary among approaches and can be as low as 39°, corresponding to TE-TM conversion efficiencies of 40%. In addition, these approaches rely on asymmetric geometries with impedance mismatches resulting in degradation of insertion loss. Further, these approaches exhibit wavelength dependent loss because they rely on periodic structures or mode coupling.

SUMMARY

Described herein are broadband and tunable optical polarization controllers (also referred to herein as "polarization rotators") with low insertion loss to achieve dynamically controlled polarization transparent photonic integrated circuits ("PICs").

An example optical polarization controller can include a substantially planar substrate and a waveguide unit cell formed on the substantially planar substrate. The waveguide unit cell can include a first out-of-plane waveguide portion and a second out-of-plane waveguide portion coupled to the first out-of-plane waveguide portion. Each of the first and second out-of-plane waveguide portions can respectively include a core material layer arranged between a first optical cladding layer having a first stress-response property and a second optical cladding layer having a second stress-response property. The first and second stress-response properties can be different such that each of the first and second out-of-plane waveguide portions is deflected by a deflection angle.

Additionally, the first out-of-plane waveguide portion can be deflected toward or away from the substantially planar substrate. Additionally, the second out-of-plane waveguide portion can be deflected toward or away from the substantially planar substrate.

Alternatively or additionally, an angle of optical polarization rotation between input and output light can be a function of the deflection angle.

Optionally, the optical polarization controller can include a plurality of waveguide unit cells coupled in series and formed on the substantially planar substrate. Additionally, an angle of optical polarization rotation between input and output light can be a function of a number of the waveguide unit cells and the deflection angle. Additionally, the optical polarization controller can include one or more in-plane waveguide portions. For example, each respective in-plane waveguide portion can be connected between two waveguide unit cells.

Alternatively or additionally, the deflection angle of at least one of the first and second out-of-plane waveguide portions can be configured to be adjustable in response to at least one of an electrical, mechanical, thermal and optical excitation. For example, at least one of the first and second out-of-plane waveguide portions can include a piezoelectric actuator layer that is provided on the first or second optical cladding layer. The piezoelectric actuator layer can be configured to expand or contract in response to an applied electric field. For example, the piezoelectric actuator layer can be a thin film formed from a piezoelectric material, including, but not limited to, AlN, GaN, ZnO and ZnS. In response to the applied electric field, the deflection angle of the at least one of the first and second out-of-plane waveguide portions can be adjusted. In addition, the angle of optical polarization rotation between input and output light is a function of the deflection angle, and therefore, by adjusting the deflection angle it is possible to adjust the angle of optical polarization rotation.

Alternatively or additionally, the core and optical cladding material layers constituting the waveguide portions can be formed from any material that allows the waveguide to guide light including, but not limited to, semiconductors (e.g., Group III-V or Group II-VI semiconductor materials), polymers, amorphous glasses, chalocogenides, etc. Optionally, the core material layer can be formed from silicon (Si). Alternatively or additionally, the first optical cladding layer can be formed from plasma enhanced chemical vapor deposition ("PECVD") silica ($SiO_2$) or buried oxide ("BOX") $SiO_2$. Additionally, the second optical cladding layer can be formed from the other of PECVD $SiO_2$ or BOX $SiO_2$.

An example photonic integrated circuit (PIC) chip can include a substantially planar substrate, electronic and photonic circuitry formed on the substantially planar substrate, and an optical polarization controller formed on the substantially planar substrate and electrically and photonically coupled to the electronic and photonic circuitry. The optical polarization controller can include a waveguide unit cell, and the waveguide unit cell can include a first out-of-plane waveguide portion and a second out-of-plane waveguide portion coupled to the first out-of-plane waveguide portion. Each of the first and second out-of-plane waveguide portions can respectively include a core material layer arranged between a first optical cladding layer having a first stress-response property and a second optical cladding layer having a second stress-response property. The first and second stress-response properties can be different such that each of the first and second out-of-plane waveguide portions is deflected by a deflection angle.

Additionally, the first out-of-plane waveguide portion can be deflected toward or away from the substantially planar substrate. Additionally, the second out-of-plane waveguide portion can be deflected toward or away from the substantially planar substrate.

Alternatively or additionally, an angle of optical polarization rotation between input and output light can be a function of the deflection angle.

Optionally, the optical polarization controller can include a plurality of waveguide unit cells coupled in series and formed on the substantially planar substrate. Additionally, an angle of optical polarization rotation between input and output light can be a function of a number of the waveguide unit cells and the deflection angle. Additionally, the optical polarization controller can include one or more in-plane waveguide portions. For example, each respective in-plane waveguide portion can be coupled between two waveguide unit cells.

Alternatively or additionally, the deflection angle of at least one of the first and second out-of-plane waveguide portions can be configured to be adjustable in response to at least one of an electrical, mechanical, thermal and optical excitation. For example, at least one of the first and second out-of-plane waveguide portions can include a piezoelectric actuator layer that is provided on the first or second optical cladding layer. The piezoelectric actuator layer can be configured to expand or contract in response to an applied electric field. For example, the piezoelectric actuator layer can be a thin film formed from a piezoelectric material, including, but not limited to, AlN, GaN, ZnO and ZnS. In response to the applied electric field, the deflection angle of the at least one of the first and second out-of-plane waveguide portions can be adjusted. In addition, the angle of optical polarization rotation between input and output light is a function of the deflection angle, and therefore, by adjusting the deflection angle it is possible to adjust the angle of optical polarization rotation.

Alternatively or additionally, the core and optical cladding material layers constituting the waveguide portions can be formed from any material that allows the waveguide to guide light including, but not limited to, semiconductors (e.g., Group III-V or Group II-VI semiconductor materials), polymers, amorphous glasses, chalocogenides, etc. Optionally, the core material layer can be formed from Si. Alternatively or additionally, the first optical cladding layer can be formed from PECVD $SiO_2$ or BOX $SiO_2$. Additionally, the second optical cladding layer can be formed from the other of PECVD $SiO_2$ or BOX $SiO_2$.

Optionally, the electronic and photonic circuitry can be based on CMOS circuitry.

Another example optical polarization controller can include a substantially planar substrate, a bus waveguide formed on the substantially planar substrate, a microring waveguide formed on the substantially planar substrate and optically coupled to the bus waveguide, and a coupling controller that is configured to adjust an amount of optical coupling between the bus waveguide and the microring waveguide. The microring waveguide can include an out-of-plane waveguide portion having a core material layer arranged between a first optical cladding layer having a first stress-response property and a second optical cladding layer having a second stress-response property. The first and second stress-response properties can be different such that the out-of-plane waveguide portion is deflected by a deflection angle.

Optionally, the out-of-plane waveguide portion can further include a first out-of-plane waveguide portion and a second out-of-plane waveguide portion coupled to the first out-of-plane waveguide portion. Each of the first and second out-of-plane waveguide portions can respectively include a core material layer arranged between a first optical cladding layer having a first stress-response property and a second optical cladding layer having a second stress-response property. The first and second stress-response properties can be different such that each of the first and second out-of-plane waveguide portions is deflected by a deflection angle.

Additionally, the first out-of-plane waveguide portion can be deflected toward or away from the substantially planar substrate. Additionally, the second out-of-plane waveguide portion can be deflected toward or away from the substantially planar substrate.

Alternatively or additionally, the microring waveguide can further include an in-plane waveguide portion connected between terminal ends of the out-of-plane waveguide portion.

Alternatively or additionally, an angle of optical polarization rotation between input and output light can be a function of the coupling between the bus waveguide and the microring waveguide. Alternatively or additionally, an angle of optical polarization rotation between input and output light can be a function of an effective path length of the microring waveguide.

Optionally, the coupling controller can be configured to adjust the amount of optical coupling between the bus waveguide and the microring waveguide by at least one of an electrical, mechanical, thermal and optical excitation. For example, the coupling controller can be controlled by a micro-heater. The micro-heater can be configured to adjust the amount of optical coupling between the bus waveguide and the microring waveguide by adjusting a temperature of the bus waveguide. It should be understood that the temperature of the bus waveguide is related to a refractive index of the bus waveguide, which effects the amount of optical coupling between the bus waveguide and the microring waveguide. Alternatively or additionally, the coupling controller can be controlled by at least one of a PIN junction, a PN junction, and a metal-oxide-silicon ("MOS") capacitor. The PIN junction, PN junction, or MOS capacitor can be configured to adjust the amount of optical coupling between the bus waveguide and the microring waveguide by carrier injection, depletion, or accumulation. It should be understood that the amount of carriers is related to the refractive index and absorption of the bus waveguide, which effects the amount of optical coupling between the bus waveguide and the microring waveguide.

Alternatively or additionally, the core and optical cladding material layers constituting the out-of-plane waveguide portion can be formed from any material that allows the waveguide to guide light including, but not limited to, semiconductors (e.g., Group III-V or Group II-VI semiconductor materials), polymers, amorphous glasses, chalocogenides, etc. Optionally, the core material layer can be formed from Si. Alternatively or additionally, the first optical cladding layer can be formed from PECVD $SiO_2$ or BOX $SiO_2$. Additionally, the second optical cladding layer can be formed from the other of PECVD $SiO_2$ or BOX $SiO_2$.

Another example PIC chip can include a substantially planar substrate, electronic and photonic circuitry formed on the substantially planar substrate, and an optical polarization controller formed on the substantially planar substrate and electrically and photonically coupled to the electronic and photonic circuitry. The optical polarization controller can include a bus waveguide, a microring waveguide optically coupled to the bus waveguide, and a coupling controller that is configured to adjust an amount of optical coupling between the bus waveguide and the microring waveguide. The microring waveguide can include an out-of-plane waveguide portion having a core material layer arranged between a first optical cladding layer having a first stress-response property and a second optical cladding layer having a second stress-response property. The first and second stress-response properties can be different such that the out-of-plane waveguide portion is deflected by a deflection angle.

Optionally, the out-of-plane waveguide portion can further include a first out-of-plane waveguide portion and a second out-of-plane waveguide portion coupled to the first out-of-plane waveguide portion. Each of the first and second out-of-plane waveguide portions can respectively include a core material layer arranged between a first optical cladding layer having a first stress-response property and a second optical cladding layer having a second stress-response property. The first and second stress-response properties can be different such that each of the first and second out-of-plane waveguide portions is deflected by a deflection angle.

Additionally, the first out-of-plane waveguide portion can be deflected toward or away from the substantially planar substrate. Additionally, the second out-of-plane waveguide portion can be deflected toward or away from the substantially planar substrate.

Alternatively or additionally, the microring waveguide can further include an in-plane waveguide portion connected between terminal ends of the out-of-plane waveguide portion.

Alternatively or additionally, an angle of optical polarization rotation between input and output light can be a function of the coupling between the bus waveguide and the microring waveguide. Alternatively or additionally, an angle of optical polarization rotation between input and output light can be a function of an effective path length of the microring waveguide.

Optionally, the coupling controller can be configured to adjust the amount of optical coupling between the bus waveguide and the microring waveguide by at least one of an electrical, mechanical, thermal and optical excitation. For example, the coupling controller can be controlled by a micro-heater. The micro-heater can be configured to adjust the amount of optical coupling between the bus waveguide and the microring waveguide by adjusting a temperature of the bus waveguide. It should be understood that the temperature of the bus waveguide is related to a refractive index of the bus waveguide, which effects the amount of optical coupling between the bus waveguide and the microring waveguide. Alternatively or additionally, the coupling controller can be controlled by at least one of a PIN junction, a PN junction, and a MOS capacitor. The PIN junction, PN junction, or MOS capacitor can be configured to adjust the amount of optical coupling between the bus waveguide and the microring waveguide by carrier injection, depletion, or accumulation. It should be understood that the amount of carriers is related to the refractive index and absorption of the bus waveguide, which effects the amount of optical coupling between the bus waveguide and the microring waveguide Alternatively or additionally, the core and optical cladding material layers constituting the out-of-plane waveguide portion can be formed from any material that allows the waveguide to guide light including, but not limited to, semiconductors (e.g., Group III-V or Group II-VI semiconductor materials), polymers, amorphous glasses, chalocogenides, etc. Optionally, the core material layer can be formed from Si. Alternatively or additionally, the first optical cladding layer can be formed from PECVD $SiO_2$ or BOX $SiO_2$. Additionally, the second optical cladding layer can be formed from the other of PECVD $SiO_2$ or BOX $SiO_2$.

Optionally, the electronic and photonic circuitry can be based on CMOS circuitry.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

In FIG. 4C, it is assumed that optical power with linear polarization is injected at the input, a linear polarizer is used at the output before photodetection, and 1 dB loss for N=8 waveguide unit cells.

FIG. 8A illustrates the contour map of $E_x$ at the input of the waveguide, FIG. 8B illustrates the contour map of $E_y$ at the input of the waveguide, FIG. 8C illustrates the contour map of $E_x$ at the output of the waveguide, and FIG. 8D illustrates the contour map of $E_y$ at the output of the waveguide.

FIG. 11A illustrates 0 V DC bias, FIG. 11B illustrates 4 V DC bias, and FIG. 11C illustrates 8 V DC bias. The resonance wavelength exhibits a slight redshift with tuning power due to the proximity of the microheater to the microring. Comparing FIGS. 11B and 11C, the conversion loss is 1.4 dB.

DETAILED DESCRIPTION

Figure 1A:
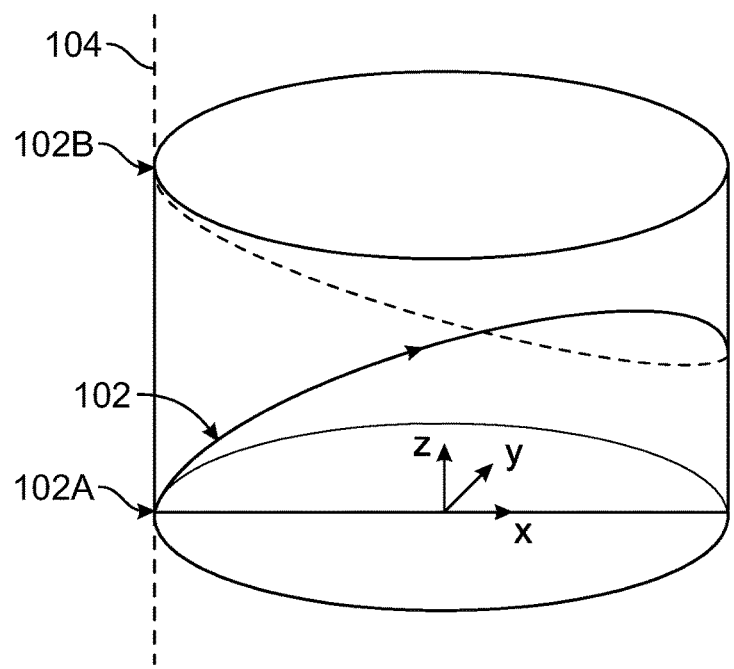
FIG. 1A is a diagram illustrating one complete turn of a helically wound optical fiber ("the helix") in physical space.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for on-chip optical polarization controllers, it will become evident to those skilled in the art that the implementations are not limited thereto.

As described above, broadband and tunable polarization rotators for polarization transparent PICS are provided herein. An example polarization rotator is based on a physical phenomena referred to as Berry's phase. Berry's phase is a quantum-mechanical phenomenon that may be observed at the macroscopic optical level through the use of an enormous number of photons in a single coherent state. A. Tomita and R. Y. Chiao, "Observation of Berry's topological phase by use of an optical fiber," Physical Review Letters 57, 937-940 (1986). According to quantum theory, the state of a particle at any given time is described by a complex wave function Ψ. If the system evolves adiabatically and then returns to its original condition, the final wave function Ψ' is related to the original wave function Ψ by Ψ'=Ψexp(iφ). The additional phase φ acquired by the system depends on a dynamic phase, whose value depends on time, and a geometric phase (i.e., Berry's phase), whose value depends on topology. M. V. Berry, "Quantal phase factors accompanying adiabatic changes," Proceedings of the Royal Society of London. Series A, Mathematical and Physical Sciences 392, 45-57 (1984). P. Senthilkumaran et al., "Fiber-optic Sagnac interferometer for the observation of Berry's topological phase," Journal of the Optical Society of America B 17, 1914-1919 (2000).

A direct macroscopic measurement of Berry's phase may be obtained through an observation of the polarization rotation of plane-polarized light when it is transported along a closed path in momentum space. Few experiments on the manifestations of Berry's phase for photons have been reported, and those that have been can be divided into those that use optical fiber and those that use discrete optical components. R. Y. Chiao and Y. S. Wu, "Manifestations of Berry's topological phase for the photon," Physical Review Letters 57, 933-936 (1986). A. Tomita and R. Y. Chiao, "Observation of Berry's topological phase by use of an optical fiber," Physical Review Letters 57, 937-940 (1986). K. Y. Bliokh et al., "Geometrodynamics of spinning light," Nature Photonics 2, 748-753 (2008). Single-mode optical fiber is a particularly useful medium for controlling the direction of momentum of light along its path length since the momentum vector is always parallel to the axis of the fiber. The angle of rotation of the polarized light does not come from a local elasto-optic effect caused by torsional stress in the fiber. Furthermore, the effect is independent of the detailed material properties of the fiber. The rotation angle arises only from the overall geometry of the path taken by the light. It is a global topological effect. A. Tomita and R. Y. Chiao, "Observation of Berry's topological phase by use of an optical fiber," Physical Review Letters 57, 937-940 (1986).

In the special case of planar (e.g., non-helical) paths, such as the paths typically taken by planar optical waveguides (e.g., optical waveguides fabricated on PICs), no significant optical rotation is observed independent of the complexity of the path. A. Tomita and R. Y. Chiao, "Observation of Berry's topological phase by use of an optical fiber," Physical Review Letters 57, 937-940 (1986). In other words, light is able to distinguish whether it is propagating in two or three spatial dimensions. In order to manifest Berry's phase in planar optical waveguides (e.g., optical waveguides fabricated on PICs), out-of-plane three-dimensional waveguides can be introduced to create a two-dimensional momentum-space with non-zero (Gaussian) curvature. Owing to its geometric origin, Berry's phase has universality in many fields of science. Berry's phase is referred to as the topological phase, geometric phase, or Pancharatnam-Berry phase. S. Pancharatnam, "Generalized Theory of Interference, and Its Applications. Part I. Coherent Pencils". Proceedings Indian Academy of Science A 44, 247-262 (1956). In classical mechanics, the Hannay angle is the analogue of the Berry phase. J. Hannay, "Angle variable holonomy in adiabatic excursion of an integrable Hamiltonian," Journal of Physics A 18, 221-230 (1985). The most widely known mechanical manifestation of Berry's phase is the Foucault pendulum. M. Foucault, "Physical demonstration of the rotation of the earth by means of the pendulum," Journal of the Franklin Institute 51, 350-353 (1851).

Figure 1B:
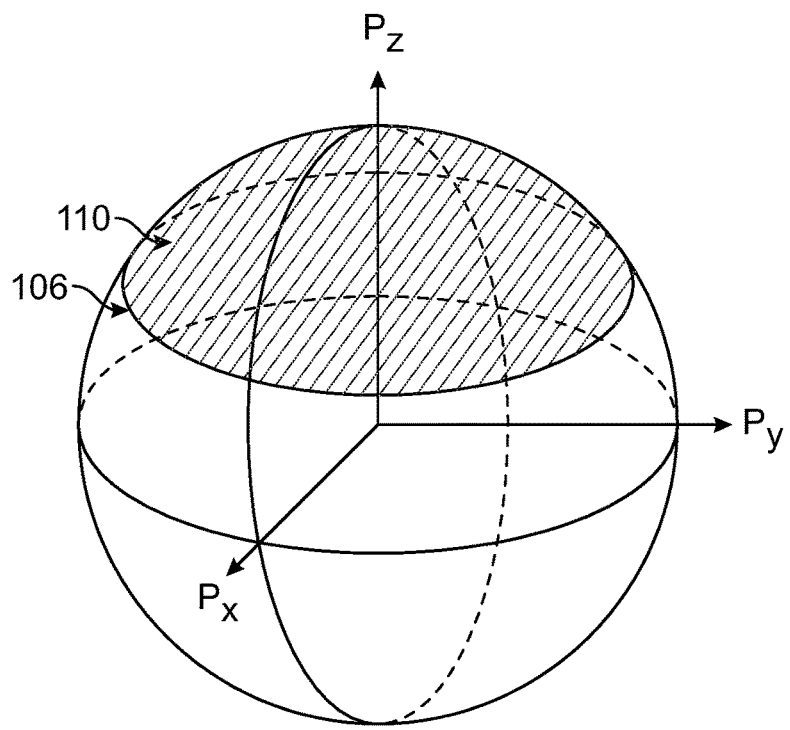
FIG. 1B is a diagram illustrating a closed curve traced out by light momentum in momentum space for one complete turn of the helix in physical space. The solid angle subtended by the shaded portion in FIG. 1B corresponds to the magnitude of the Berry's phase, which manifests as a polarization rotation.

Berry's phase has been observed in helically wound optical fibers. A. Tomita and R. Y. Chiao, "Observation of Berry's topological phase by use of an optical fiber," Physical Review Letters 57, 937-940 (1986). As described in detail below, Berry's phase can also be exploited in planar optical waveguides (e.g., optical waveguides fabricated on PICs). The propagation vector of light traveling in a single-mode fiber is constrained to be parallel to the local fiber axis. Thus, when a fiber 102 is wound into a helical path in physical-space as shown in FIG. 1A, the direction of momentum of light continuously changes in a way that can be represented on a momentum-space sphere as shown in FIG. 1B. Monochromatic light at wavelength 2 carries a momentum given by $\bar{p}=\hat{x}p_x+\hat{y}p_y+\hat{z}p_z=\hbar\bar{k}$, where $\bar{k}$ is the propagation vector with magnitude $2\pi/\lambda$ and $\hbar$ is Planck's constant divided by $2\pi$. Referring to FIG. 1A, the ends 102A, 102B of the helically wound part of the fiber loop are arranged to lie along the same axis 104, so that the light travels through a closed path in momentum-space (e.g., the closed curve 106 shown in FIG. 1B). Referring now to FIG. 1B, the magnitude of the rotation of polarization is equal to the magnitude of the Berry's phase, which is equal to the solid angle subtended by the shaded area 110 at the center of the momentum-space sphere. Variations in the helical geometry results in variations in Berry's phase. F. Wassmann and A. Ankiewicz, "Berry's phase analysis of polarization rotation in helicoidal fibers," Applied Optics 37, 3902-3911 (1998). A change in wavelength of the light results in a change of the radius of the sphere in momentum-space but not the solid angle. Therefore, the effect is intrinsically broadband.

A necessary condition for the existence of non-trivial Berry's phase is that the system possesses a momentum space with non-zero subtended solid angle. In the vernacular of differential geometry, a system must possess a phase space with non-zero Gaussian curvature to observe Berry's phase. It should be understood that in-plane optical waveguides (or planar optical waveguides) possess zero Gaussian curvature, and therefore, do not observe Berry's phase. In order to observe Berry's phase, at least a portion of the planar optical waveguides can be deflected out-of-plane, which is described in detail below.

Figure 2A:
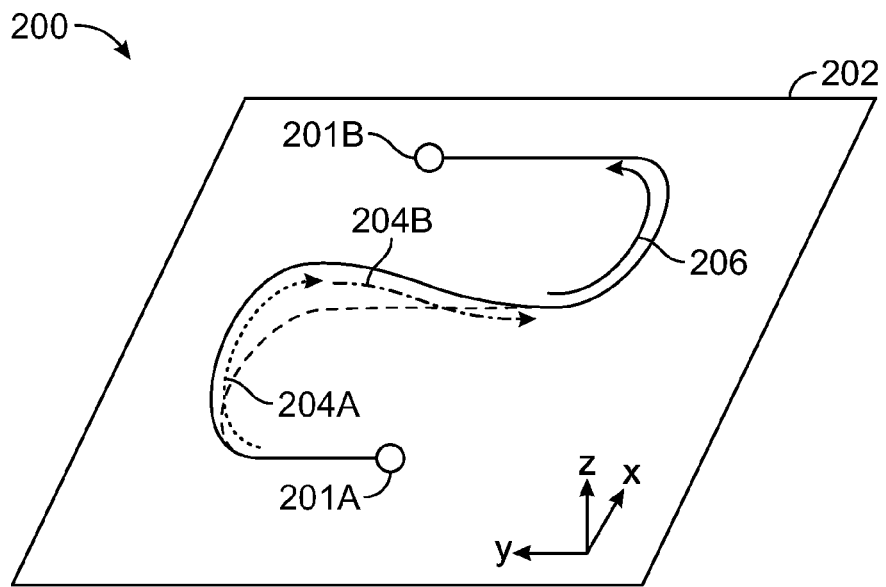
FIG. 2A is a schematic diagram of an example optical polarization controller (also referred to herein as a "polarization rotator") in physical space.

Referring now to FIG. 2A, a schematic diagram of an example optical polarization controller 200 (also referred to herein as a "polarization rotator") in physical space is shown. The optical polarization controller 200 can include a substantially planar substrate 202 and a waveguide unit cell (described below) formed on the substantially planar substrate 202. Light, for example emitted by a light source such as a laser, a light emitting diode, etc., can be input into the optical polarization controller 200 at coupling point 201A. The light can be output from the optical polarization controller 200 at coupling point 201B. Optionally, the light can be input/output to/from the optical polarization controller 200 through cantilever couplers, which are described in detail in U.S. Pat. No. 8,442,368 to Reano et al., entitled "Cantilever Couplers for Intra-Chip Coupling to Photonic Integrated Circuits." Optionally, the substantially planar substrate 202 can be based on a Si substrate. Although Si is provided as an example material for the substantially planar substrate 202, it can optionally be formed of other materials including, but not limited to, semiconductors, polymers, amorphous glasses, chalcogenides, and electro-optical crystals. The substantially planar substrate 202 can optionally be a PIC chip. It should be understood that a PIC chip can be a device that incorporates electronic and photonic circuitry. As used herein, photonic circuitry performs functions based on the physics of photons, and electronic circuitry performs functions based on the physics of electrons.

Figure 2B:
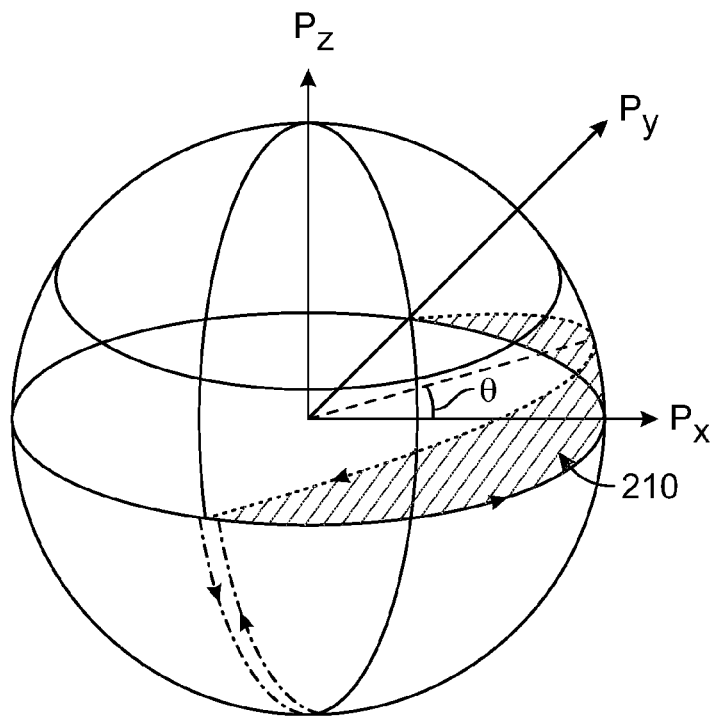
FIG. 2B is a diagram illustrating light traveling through the optical polarization controller shown in FIG. 2A in momentum space. The non-zero solid angle subtended by the shaded surface in FIG. 2B corresponds to non-zero Berry's phase, which manifests as a polarization rotation.

The waveguide unit cell can include a first out-of-plane waveguide portion 204A and a second out-of-plane waveguide portion 204B coupled to the first out-of-plane waveguide portion 204A. Although a single waveguide unit cell is shown in FIG. 2A, it is possible to provide an optical polarization controller having a plurality of waveguide unit cells (described below). The first out-of-plane waveguide portion 204A can be deflected either vertically up or down, and the second out-of-plane waveguide portion 204B can be deflected the opposite direction as the first out-of-plane waveguide portion 204A, e.g., either vertically down or up. As shown in FIG. 2A, the first out-of-plane waveguide portion 204A (i.e., the dotted line) forms a 180° bend and ascends from a minimum height (e.g., the substantially planar substrate 202) to a maximum height (e.g., spaced away from the substantially planar substrate 202). It should be understood that the first out-of-plane waveguide portion 204A can form a bend of more or less than 180°, which is provided only as an example. In other words, the first out-of-plane waveguide portion 204A is deflected away from the substantially planar substrate 202, for example, by a deflection angle (described below). The light traveling through the first out-of-plane waveguide portion 204A in the momentum space is shown by the dotted line in FIG. 2B. As shown in FIG. 2A, the second out-of-plane waveguide portion 204B (i.e., the dashed-dotted line) descends from the maximum height (e.g., where it is coupled to the first out-of-plane waveguide portion 204A) to the minimum height (e.g., the substantially planar substrate 202). In other words, the second out-of-plane waveguide portion 204B is deflected toward the substantially planar substrate 202, for example, by the deflection angle (described below). The light traveling through the second out-of-plane waveguide portion 204B in the momentum space is shown by the dashed-dotted line in FIG. 2B. As shown in FIG. 2A, the optical polarization controller 200 can also include an in-plane waveguide portion 206 (i.e., the solid line), for example, which is coupled to the second out-of-plane waveguide portion 204B. As used herein, an in-plane waveguide portion is a not-out-of-plane waveguide portion (i.e., it is not deflected away from/toward the substantially planar substrate 202). As shown in FIG. 2B, the in-plane waveguide portion 206 forms a 180° bend and remains in-plane with the substantially planar substrate 202. It should be understood that the in-plane waveguide portion 206 can form a bend of more or less than 180°, which is provided only as an example. The light traveling through the in-plane waveguide portion 206 in the momentum space is shown by the solid line in FIG. 2B. Light propagation along this three-dimensional configuration in physical space (i.e., through the first out-of-plane waveguide portion 204A, the second out-of-plane waveguide portion 204B and the in-plane waveguide portion 206 shown in FIG. 2A) results in a non-zero subtended solid angle in momentum space, which is shown as the shaded area 210 in FIG. 2B. Therefore, the optical polarization controller 200 exhibits Berry's phase. As described above, a change in wavelength results in a change of the radius of the sphere in momentum space shown in FIG. 2B, but not a change in the solid angle. Therefore, the effect is intrinsically broadband.

Referring again to FIG. 2B, θ denotes the angle of ascent/descent (or deflection) of the first out-of-plane waveguide portion 204A/the second out-of-plane waveguide portion 204B in the physical space shown in FIG. 2A. The output light (e.g., the light output at coupling point 201B) appears with polarization rotation equal to 2θ (e.g., as compared to the light input at coupling point 201A) due to Berry's phase because the magnitude of the solid angle extended by the shaded area 210 in momentum space shown in FIG. 2B is 2θ. In other words, an angle of optical polarization rotation between input and output light can be a function of the deflection angle (e.g., angle of polarization rotation=2θ, where θ is the deflection angle). Additionally, and as described below with regard to FIGS. 4A-4C, a series concatenation of N waveguide unit cells (e.g., a plurality of waveguide unit cells described with regard to FIGS. 2A-2B) produces a polarization rotation of 2Nθ. In other words, an angle of optical polarization rotation between input and output light can be a function of a number of waveguide unit cells and the deflection angle (e.g., angle of polarization rotation=2Nθ, where N is the number of waveguide unit cells and θ is the deflection angle). Further, for optical power with linear polarization injected at the input, the presence of a linear polarizer at the output yields a prediction for the functional form of the output power that is proportional to $\cos^2(2N\theta)$.

Figure 3A:
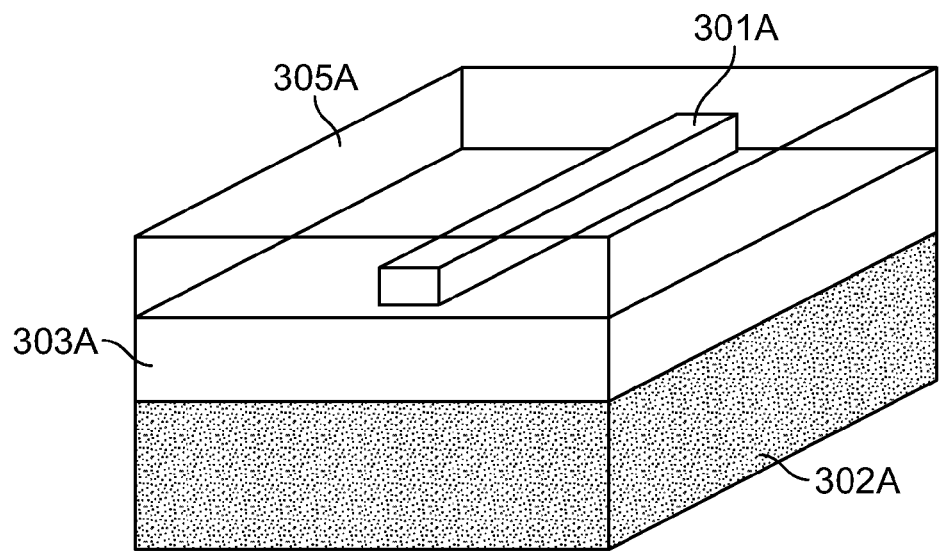
FIG. 3A is a diagram illustrating an in-plane optical waveguide.
Figure 3B:
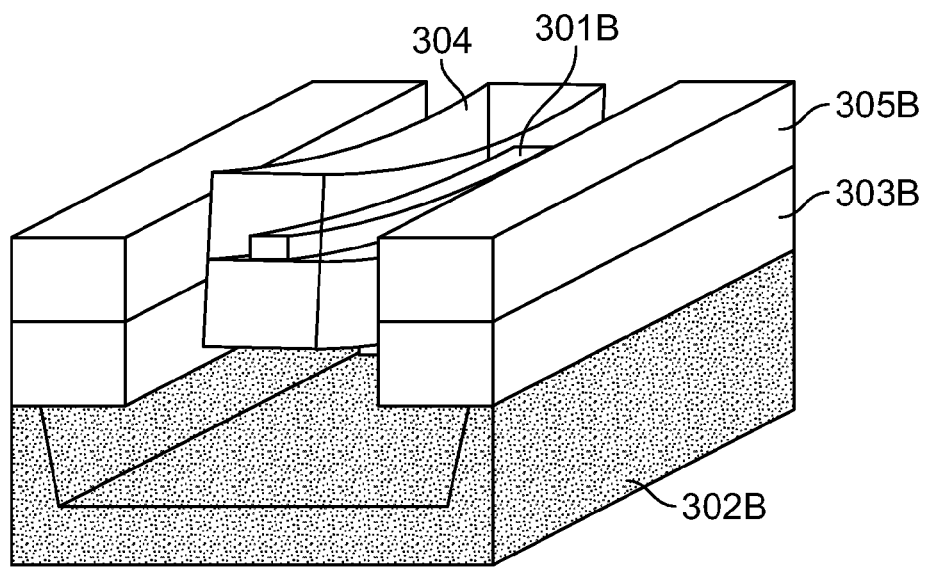
FIG. 3B is a diagram illustrating an example out-of-plane optical waveguide.
Figure 3C:
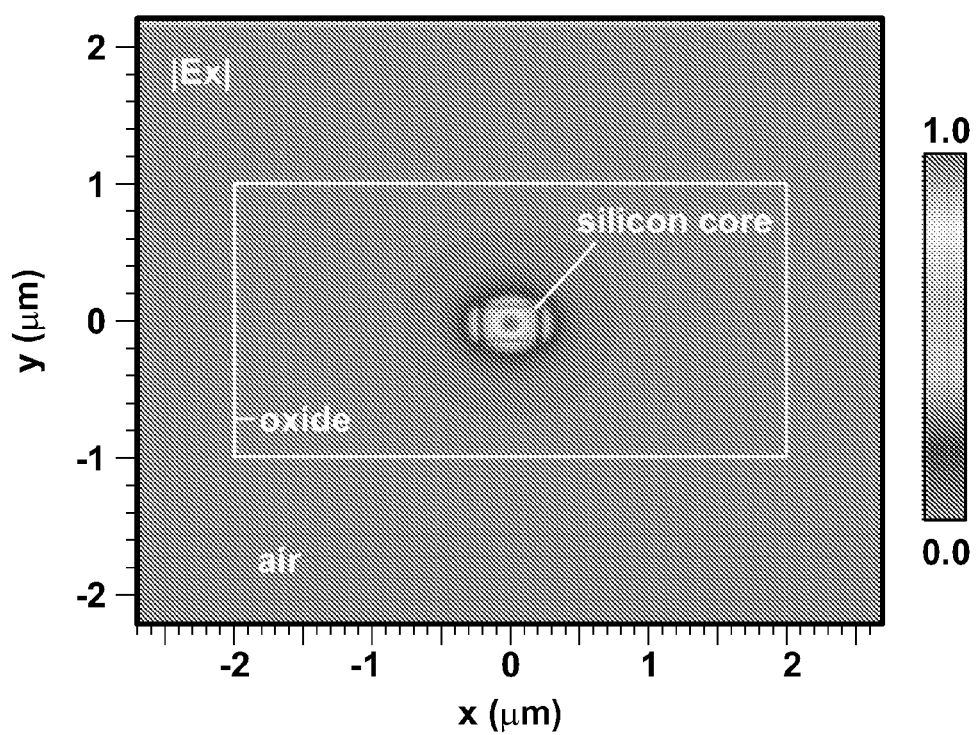
FIG. 3C illustrates that the optical mode is highly confined to the waveguide core so the oxide-air boundary is insignificant.

Referring now to FIGS. 3A-3B, example optical waveguides are shown. In particular, FIG. 3A is a diagram illustrating an in-plane optical waveguide. The in-plane optical waveguide is formed on a substantially planar substrate 302A and includes a core material layer 301A arranged between a first optical cladding layer 303A and a second optical cladding layer 305A. In contrast, FIG. 3B is a diagram illustrating an example out-of-plane optical waveguide 304. In order to deflect optical waveguides out-of-plane, bilayer thin film stress between top and bottom optical cladding layers of free-standing silicon strip waveguides can be exploited. For example, a silicon waveguide core can be embedded within an oxide thin film bilayer cladding that deflects out-of-plane because of residual stress. Accordingly, each of the first and second out-of-plane optical waveguide portions 204A, 204B shown in FIG. 2A (described with regard to FIG. 3B as an "out-of-plane optical waveguide 304") can be deflected out-of-plane (e.g., either vertically up or down with respect to a plane) by exploiting bilayer thin film stress between the optical cladding layers. The out-of-plane optical waveguide 304 can be formed on a substantially planar substrate 302B, e.g., a substantially planar Si substrate. Although Si is provided as an example material for the substantially planar substrate 302B, it can optionally be formed of other materials including, but not limited to, semiconductors, polymers, amorphous glasses, chalcogenides, and electro-optical crystals. The out-of-plane optical waveguide 304 can include a core material layer 301B arranged between a first optical cladding layer 303B having a first stress-response property and a second optical cladding layer 305B having a second stress-response property. The first and second stress-response properties can be different such that the out-of-plane optical waveguide 304 is deflected out-of-plane by a deflection angle. The first and second optical cladding layers 303B and 305B are also referred to herein as the "bilayer optical cladding." The out-of-plane deflection of the out-of-plane optical waveguide 304 relies on the thin film stress that arises naturally from thin film deposition. The sum of mean and gradient stresses results in a spontaneous out-of-plane deflection when the out-of-plane optical waveguide 304 is released from the substantially planar substrate 302B. P. Sun and R. M. Reano, "Cantilever couplers for intra-chip coupling to silicon photonic integrated circuits," Optics Express 17, 4565-4574 (2009). The core material layer can be formed from any material that allows the waveguide to guide light including, but not limited to, semiconductors (e.g., Group III-V or Group II-VI semiconductor materials), polymers, amorphous glasses, chalocogenides, etc. Optionally, the core material layer can be formed from Si. Optionally, the first optical cladding layer 303B is PECVD silica or BOX silica, and the second optical cladding layer 305B is the other of BOX silica or PECVD silica. For example, in FIG. 3B, the first optical cladding layer 303B can be BOX silica and the second optical cladding layer 305B can be PECVD silica. Although PECVD silica and BOX silica are provided as example materials for the first and second optical cladding layers 303B and 305B, this disclosure contemplates using other materials with different stress-response properties as the bilayer optical cladding. As shown in FIG. 3C, numerical analysis of the electromagnetic mode, indicated by the magnitude of the x-component of the optical electric field, $|E_x|$, shows high confinement to the waveguide core (e.g., the core material layer 301B in FIG. 3B) at telecommunications wavelengths so the oxide air boundary is insignificant.

Figure 4A:
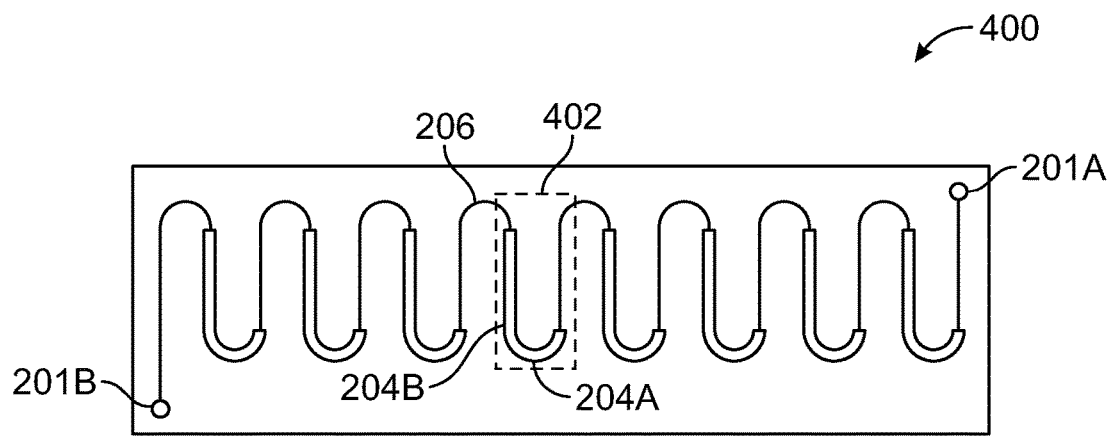
FIG. 4A is a schematic diagram illustrating an optical polarization controller having a plurality of waveguide unit cells.

Referring to FIG. 4A, a schematic diagram illustrating an optical polarization controller 400 having a plurality of waveguide unit cells 402 is shown. The optical polarization controller 400 can include a substantially planar substrate 202 and a plurality of waveguide unit cells 402 formed on the substantially planar substrate 202. In particular, a series concatenation of eight waveguide unit cells 402 (N=8) is shown in FIG. 4A. In other words, the optical polarization controller 400 can include a plurality of waveguide unit cells 402 coupled in series and formed on the substantially planar substrate 202. Although eight waveguide unit cells are provided as an example herein, this disclosure contemplates using any number of waveguide unit cells (e.g., more or less than 8) in the optical polarization controller 400. Similar to FIG. 2A, the optical polarization controller 400 shown in FIG. 4A can include a coupling point 201A for inputting light and a coupling point 201B for outputting light. For example, the light can optionally be input/output to/from the optical polarization controller 400 through cantilever couplers, which are described in detail in U.S. Pat. No. 8,442,368 to Reano et al., entitled "Cantilever Couplers for Intra-Chip Coupling to Photonic Integrated Circuits."

Each of the waveguide unit cells 402 can include a first out-of-plane waveguide portion 204A and a second out-of-plane waveguide portion 204B, which is coupled to the first out-of-plane waveguide portion 204A. The waveguide unit cells can be defined by electron beam lithography and released by plasma etching, as described above with regard to FIG. 3B, for example. P. Sun and R. M. Reano, "Cantilever couplers for intra-chip coupling to silicon photonic integrated circuits," Optics Express 17, 4565-4574 (2009). Alternatively, the waveguide unit cells 402 can be defined by other microfabrication lithography techniques including, but not limited to, photolithography and nanoimprint lithography and released by other microfabrication patterning techniques including, but not limited to, wet, dry, and particle beam etching. The first and second out-of-plane waveguide portions 204A and 204B are described in detail above and are therefore not described in further detail below. Additionally, as shown in FIG. 4A, the optical polarization controller can include one or more in-plane waveguide portions 206, which are also described in detail above and are therefore not described in further detail below. Each respective in-plane waveguide portion 206 can be connected between two waveguide unit cells 402, as shown in FIG. 4A.

Figure 4B:
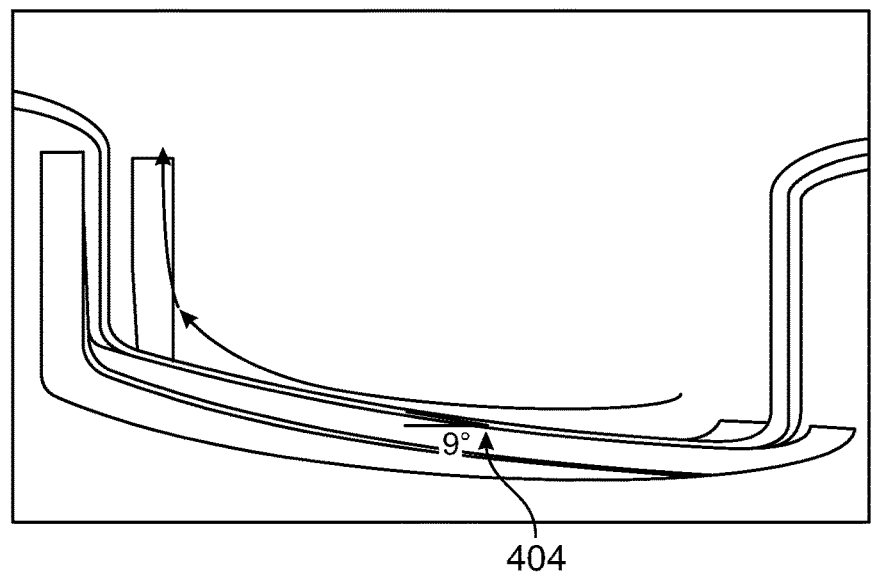
FIG. 4B is a scanning electron micrograph ("SEM") of a waveguide unit cell showing a pitch angle of θ=9°.
Figure 4C:
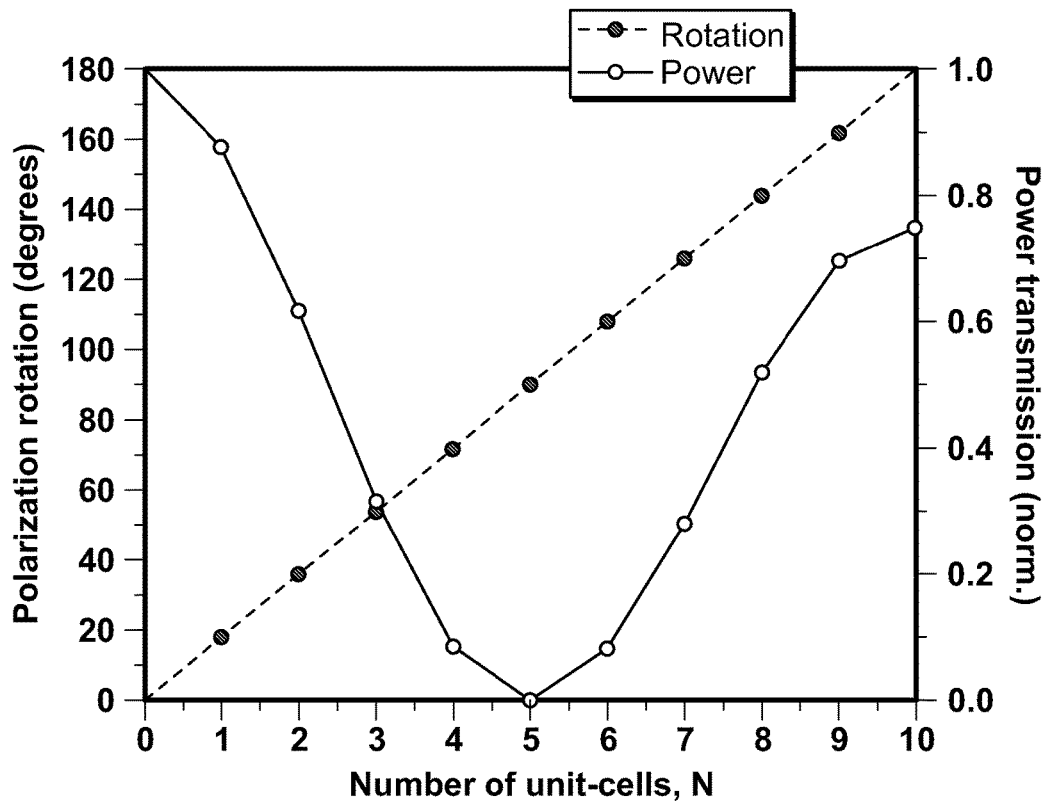
FIG. 4C is a graph illustrating predicted polarization rotation due to Berry's phase and corresponding power transmission versus a number of waveguide unit cells.

Referring now to FIG. 4B, a scanning electron micrograph ("SEM") of a waveguide unit cell (e.g., one of the waveguide unit cells 402 shown in FIG. 4A) is shown. In particular, FIG. 4B shows a pitch (i.e., deflection) angle 404 of the waveguide with respect to the chip surface (e.g., the substantially planar substrate 202 shown in FIG. 4A) of $\theta=9°$. It should be understood that the pitch angle of $\theta=9°$ is provided only as an example and that other pitch angles more or less than $\theta=9°$ can be achieved. An angle of optical polarization rotation between input and output light can be a function of a number of the waveguide unit cells and the deflection angle (e.g., angle of polarization rotation=$2N\theta$, where N is the number of waveguide unit cells and $\theta$ is the deflection (i.e., pitch) angle). For example, given $\theta=9°$, the polarization rotation due to Berry's phase and normalized output power versus N waveguide unit cells is shown in FIG. 4C. This disclosure contemplates that circuit layouts and/or fabrication processes can be used to maximize the pitch angle, $\theta$, in order to minimize the total number of waveguide unit cells that are required. In addition, the bandwidth at telecommunications wavelengths is extraordinary, and possibly, limited only by the wavelength range such that the waveguide remains single mode for TE and TM polarizations.

Figure 5:
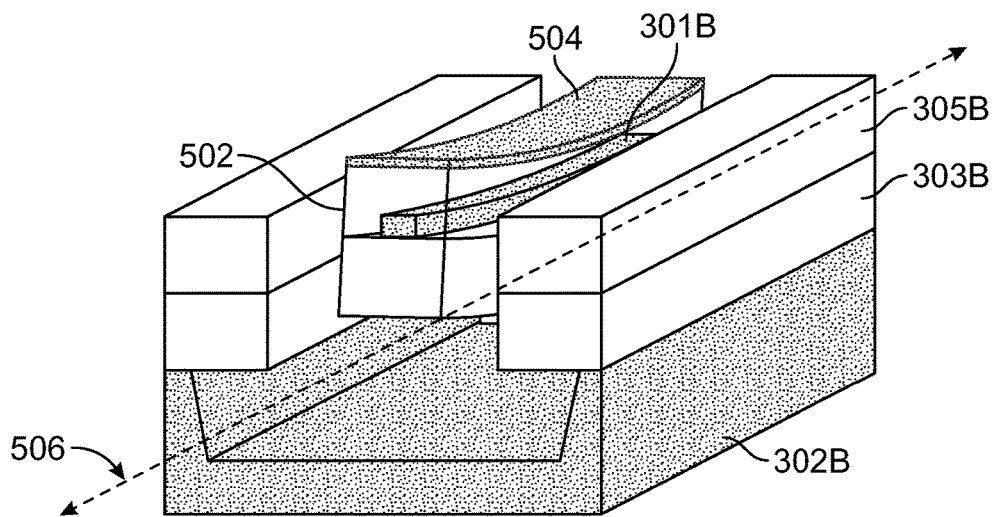
FIG. 5 is a diagram illustrating an example out-of-plane optical waveguide having a piezoelectric actuator layer for voltage control of angular deflection.

The deflection angle of an out-of plane waveguide (e.g., the first and/or second out-of-plane waveguide portions 204A, 204B shown in FIG. 2A) can be configured to be adjustable in response to at least one of an electrical, mechanical, thermal and optical excitation. For example, the amount of deflection can be adjusted mechanically, for example, by turning a screw that applies pressure to the out-of-plane waveguide. Alternatively or additionally, the amount of deflection can be adjusted thermally, for example, by fabricating a layer of metal cladding over the out-of-plane waveguide and applying a voltage thereto. This causes a current to flow in the metal cladding, and due to stress caused by the different thermal expansion coefficients of the metal cladding and the out-of-plane waveguide (e.g., optical cladding layers), the amount of deflection can be controlled. Alternatively or additionally, the amount of deflection can be adjusted optically, for example, by shining a light on the out-of-plane waveguide, which causes its temperature to change. Referring now to FIG. 5, a diagram illustrating an example out-of-plane optical waveguide 502 having a piezoelectric actuator layer for voltage control of angular deflection is shown. The out-of-plane optical waveguide 502 is similar to the out-of-plane optical waveguide 304 shown in FIG. 3B. For example, the out-of-plane optical waveguide 502 can be formed on a substantially planar substrate 302B. Additionally, the out-of-plane optical waveguide 502 can include a core material layer 301B arranged between a first optical cladding layer 303B having a first stress-response property and a second optical cladding layer 305B having a second stress-response property. The first and second stress-response properties can be different such that the out-of-plane optical waveguide 502 is deflected out-of-plane by a deflection angle. As described above, the out-of-plane optical waveguide 502 can be the first and/or second out-of-plane waveguide portions described herein. The substantially planar substrate 302B and the first and second optical cladding layer 303B and 305B are described in detail above and are therefore not described in further detail below.

As shown in FIG. 5, a piezoelectric actuator layer 504 (e.g., a piezoelectric thin film) can be provided on the out-of-plane optical waveguide 502. The piezoelectric actuator layer 504 can be fabricated on top of the bilayer optical cladding, for example, on the second optical cladding layer 305B as shown in FIG. 5. For example, the piezoelectric actuator layer 504 can be a thin film formed from a piezoelectric material including, but not limited to, AlN, GaN, ZnO and ZnS. These materials are attractive because of their low temperature processing temperatures. S. Wilson et al., "New materials for micro-scale sensors and actuators: An engineering review," Material Science and Engineering R: Reports 56, 1-129 (2007). As an example, AlN thin films can be prepared by magnetron sputtering. Although AlN, GaN, ZnO and ZnS are provided as example materials, this disclosure contemplates using other materials for the piezoelectric actuator layer 504. By controlling the sputtering conditions, the AlN can exhibit (002) orientation on select metal layers suitable for electrical actuation. M. Ishihara et al., "Control of preferential orientation of AlN films prepared by the reactive sputtering method," Thin Solid Films 316, 152-158 (1998). X.-H. Xu et al., "Morphological properties of AlN piezoelectric thin films deposited by DC reactive magnetron sputtering," Thin Solid Films 388, 62-67 (2001). The sputter conditions in argon include the sputter power, the chamber pressure, the spacing between the Al target and substrate, and the $N_2$ concentration in the $Ar/N_2$ mixture. Preferential crystal orientation in the (002) direction can be obtained at small target-substrate spacing, low chamber pressure, moderate power, and $N_2$ concentration of ~50%. The amount of voltage required per deflection angle per waveguide length can be predicted given the actuator geometry, film thicknesses, piezoelectric coefficient, and Young's modulus. M. R. Steel et al., "The piezoelectric bimorph: An experimental and theoretical study of its quasistatic response," Journal of Physics D: Applied Physics 11, 979-989 (1978). F. Martin, et al., "Thickness dependence of the properties of highly c-axis textured AlN thin films," Journal of Vacuum Science and Technology A: Vacuum, Surfaces, and Films 22, 361-365 (2004). For example, an AlN film thickness of 250 nm and actuation voltage of 14 V results in a deflection angle of 1 μm for a waveguide length of 200 μm for the out-of-plane optical waveguide 502 shown in FIG. 5. Longer waveguide lengths result in lower actuation voltages.

The piezoelectric actuator layer 504 is incorporated for voltage control of the amount of deflection of the out-of-plane optical waveguide 502. As described above, the angle of optical polarization rotation between input and output light is a function of the deflection angle, and therefore, by adjusting the deflection angle of the out-of-plane optical waveguide 504, it is possible to adjust the angle of optical polarization rotation. In other words, voltage control allows for dynamic tuning of Berry's phase in any optical polarization controller described herein. For example, when an external electric field is applied to the piezoelectric actuator layer 504, the piezoelectric actuator layer 504 contracts or expands along the waveguide longitudinal direction 506 (e.g., the dotted line in FIG. 5). Accordingly, it is possible to tune the angular deflection of the out-of-plane optical waveguide 502. Further, since the electromagnetic mode is highly confined to the silicon waveguide (e.g., the core material layer 301B), the optical field is negligibly perturbed by the piezoelectric actuator layer 504.

Figure 6A:
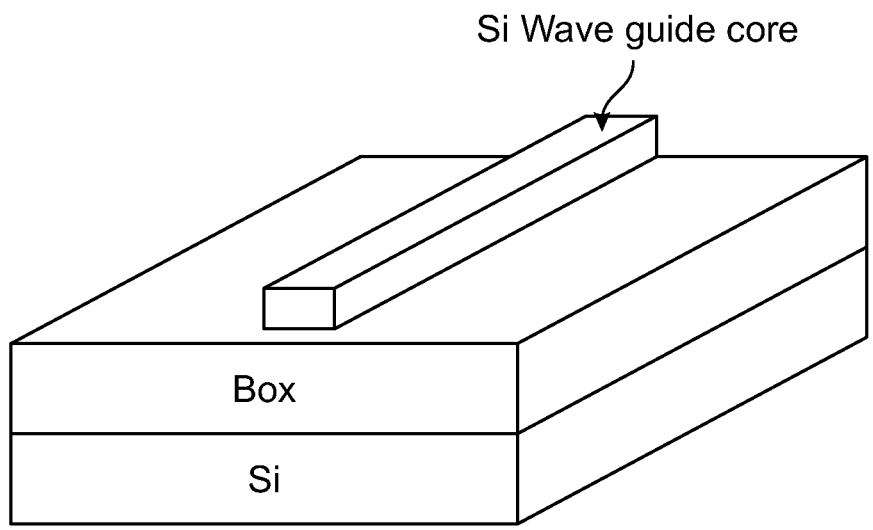
FIGS. 6A-6F is a set of drawings illustrating an example method of fabricating an out-of-plane optical waveguide.
Figure 6B:
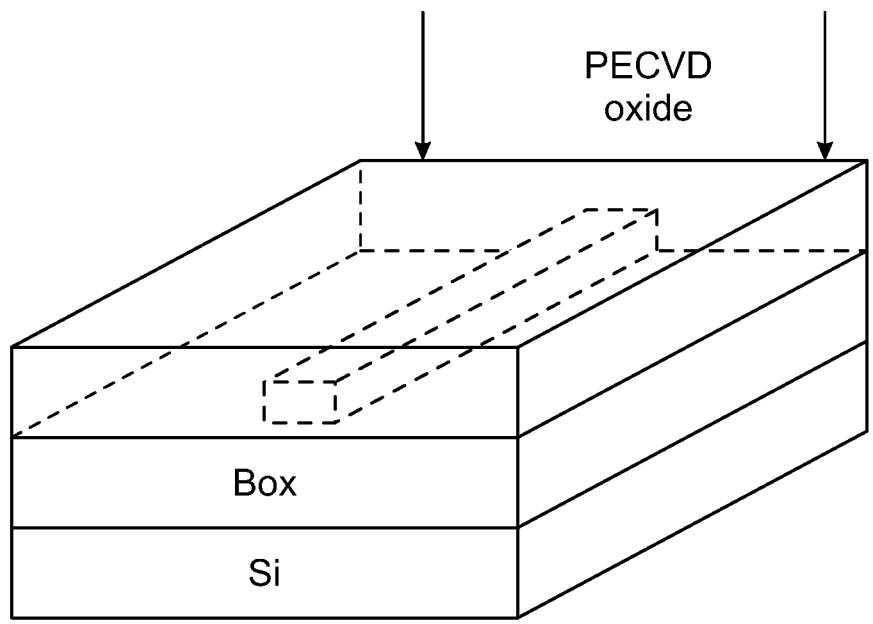
Figure 6C:
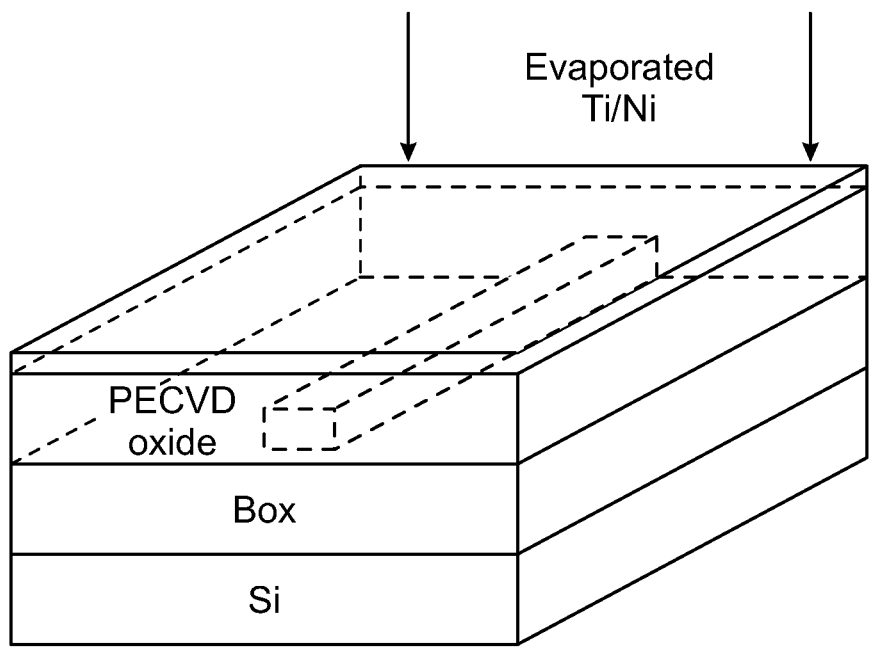
Figure 6D:
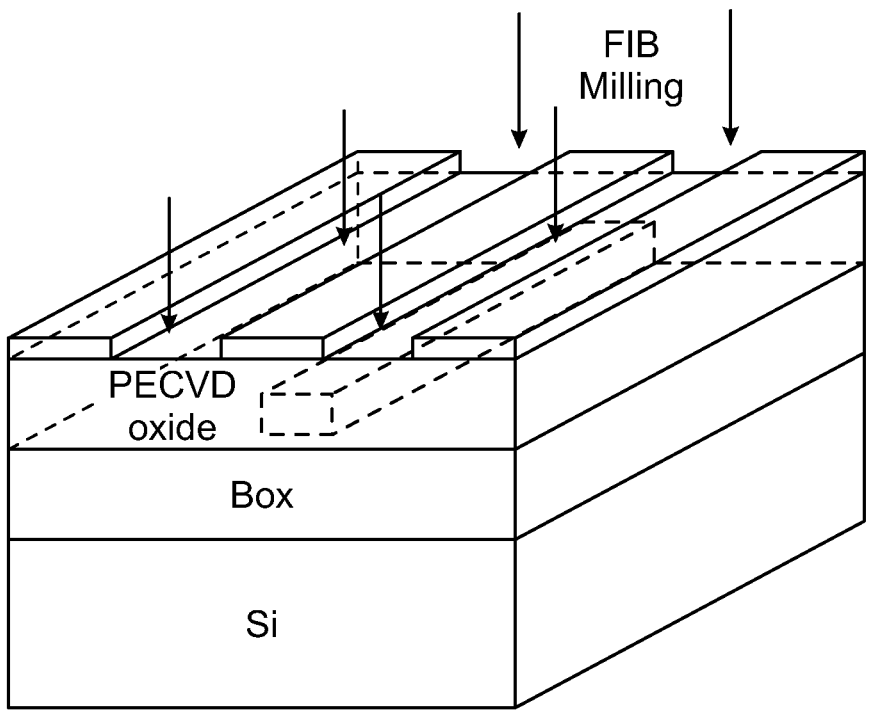
Figure 6E:
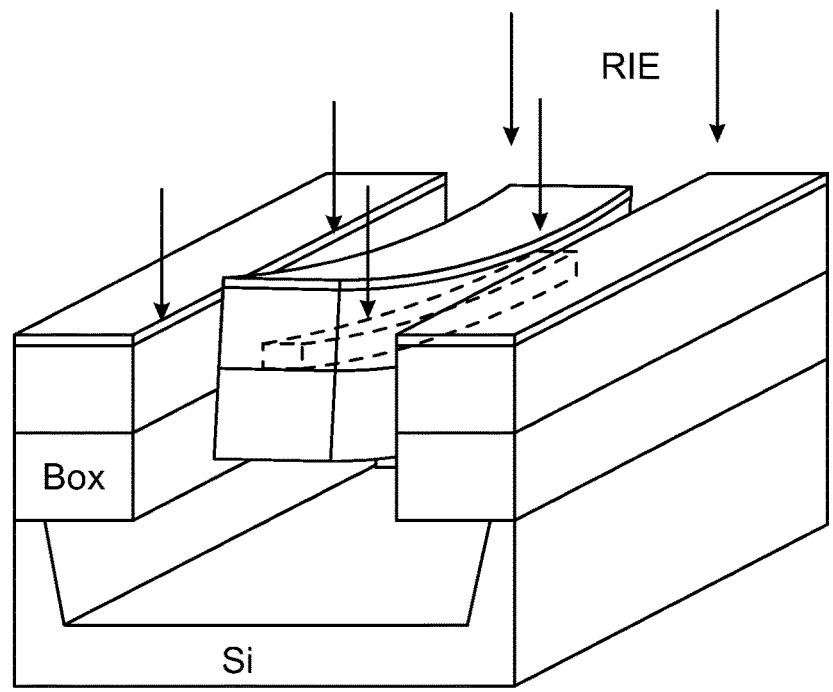
Figure 6F:
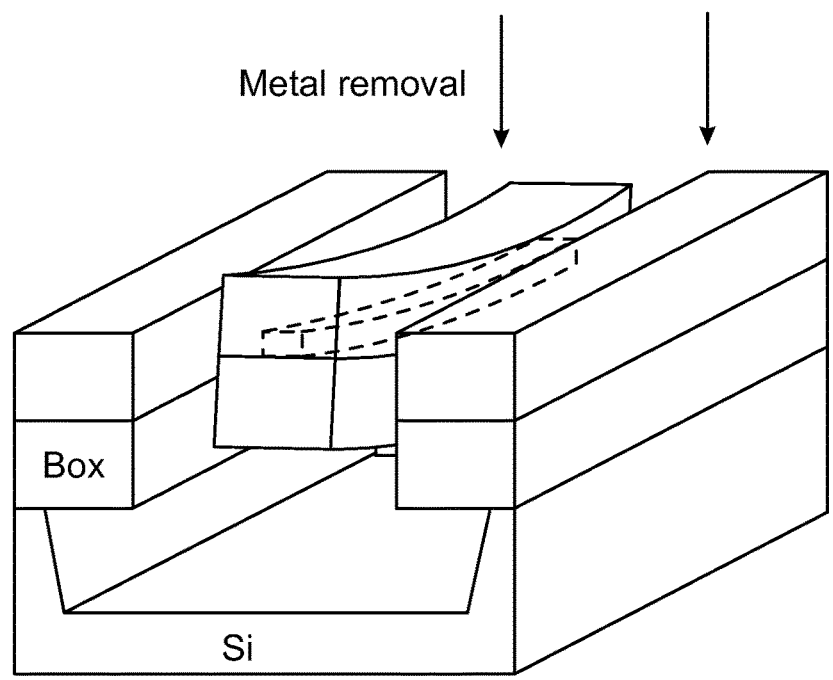

Referring now to FIGS. 6A-6F, a set of drawings illustrating an example method of fabricating an out-of-plane optical waveguide is shown. This disclosure contemplates that the out-of-plane optical waveguides described herein can be fabricated according to the example process flow described below. Alternatively, the out-of-plane optical waveguides can be fabricated according to other microfabrication techniques, such as electron beam lithography and photolithography, and based on other chemistries and pattern transfer materials. The principle is to release the out-of-plane optical waveguide from the substrate so that the optical waveguide can deflect out-of-plane due to thin film stress. In the current example, first, as shown in FIG. 6A, a waveguide core is fabricated on the SOI substrate. Second, as shown is FIG. 6B, a (1.1 µm) layer of PECVD $SiO_2$ is applied using $SiH_4$—$N_2O$ chemistry at 200° C., covering the waveguide core. A 5 nm titanium adhesive layer and a 150 nm nickel mask are then evaporated on top of the PECVD $SiO_2$ (FIG. 6C). The patterns for the out-of-plane waveguide are written directly on the Ti/Ni mask by focused Ga+ ion beam (FIB) milling at 30 kV with a nominal milling depth of 250 nm (FIG. 6D). The metal mask patterns are transferred to the $SiO_2$ layer by reactive ion etching (RIE) using $SF_6$ chemistry (FIG. 6E). The schematic shows deflection of the out-of-plane optical waveguide after ion etching, however, this is merely for illustrative purposes to demonstrate that the out-of-plane optical waveguide is released from the bulk Si device, as further deflection occurs during later heat curing or annealing. In an exemplary embodiment, the etch recipe is tuned to etch $SiO_2$ anisotropically and to etch silicon isotropically with large undercut in order to fully release the out-of-plane optical waveguide from the substrate and aid deflection. As shown, it is clear that the Si waveguide core is preferably protected from the RIE, as the RIE etches the Si chip and would also be expected to etch the waveguide. Finally, the Ti/Ni mask is removed with $HNO_3$ and HCl solutions (FIG. 6F). In addition, as described above with regard to FIG. 5, a piezoelectric actuator layer can be fabricated on top of the out-of-plane optical waveguide.

Figure 7:
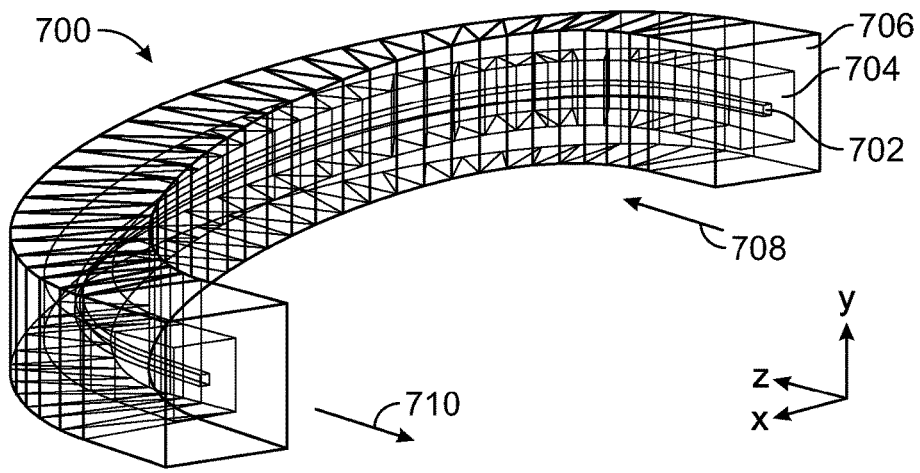
FIG. 7 is a diagram illustrating a waveguide used for finite-element method ("FEM") simulation.
Figure 8A:
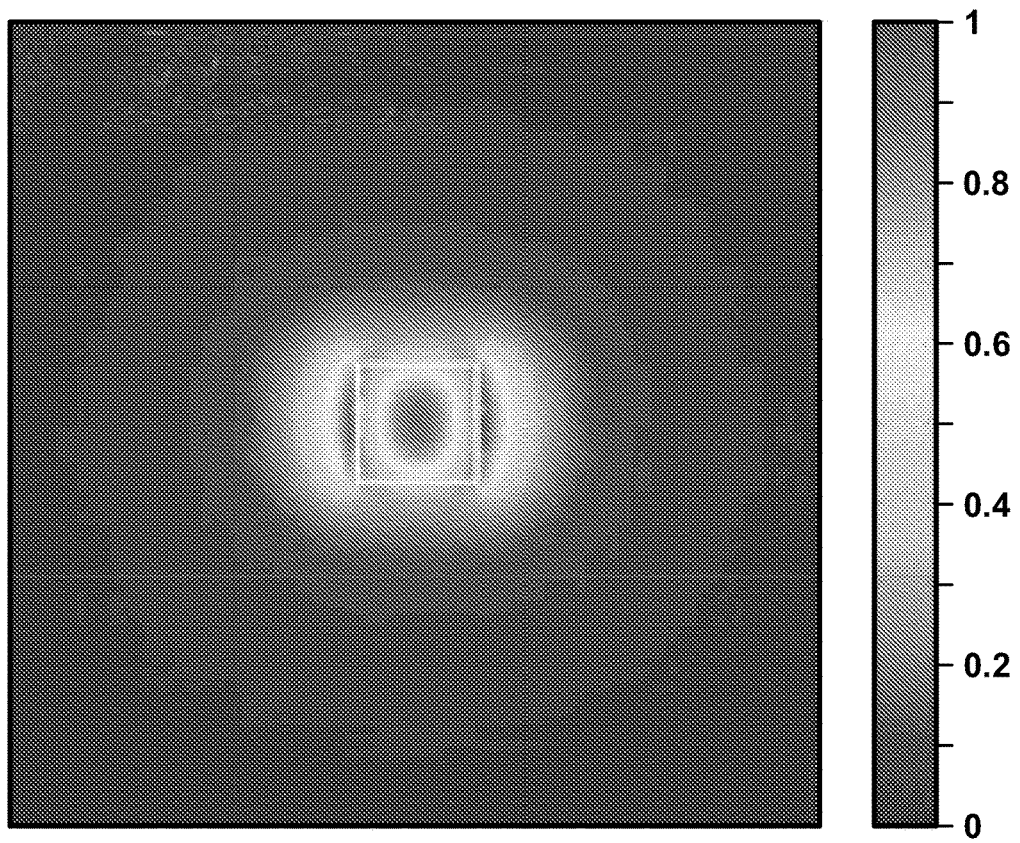
FIGS. 8A-8D are contour maps of electric fields at the input and output of the simulated silicon waveguide, with 300 nm×300 nm cross-section, shown in FIG. 7. The designed polarization rotation angle is 60°. In particular.
Figure 8B:
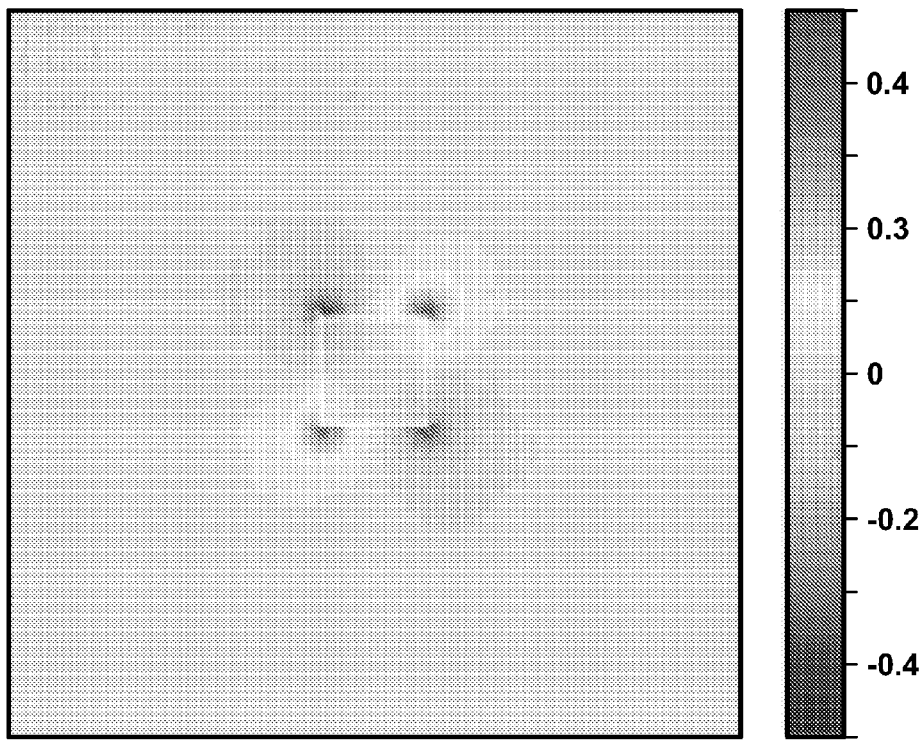
Figure 8C:
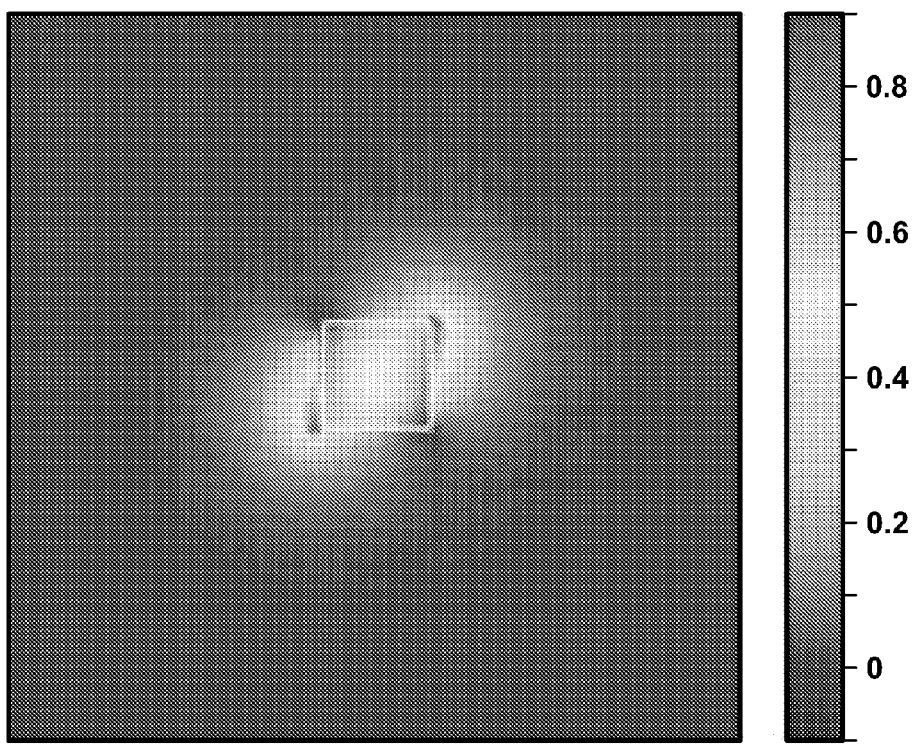
Figure 8D:
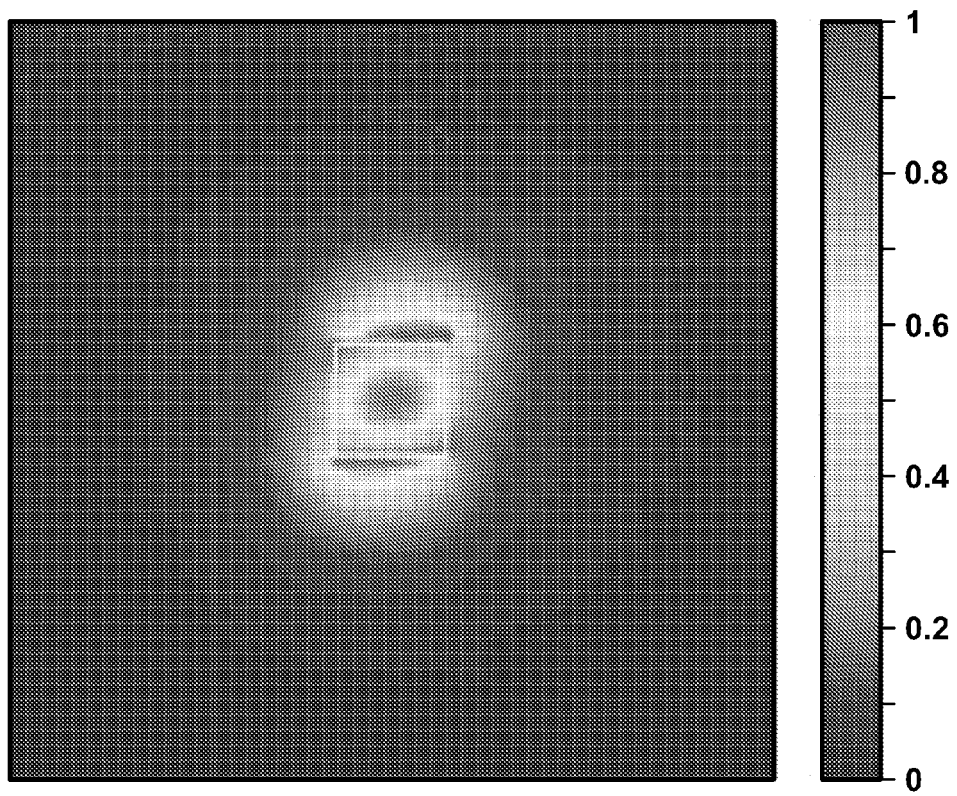

Referring now to FIG. 7, a diagram illustrating a waveguide 700 used for FEM simulation is shown. In the FEM simulations, the silicon waveguide 702 is buried in 1-µm-thick silicon dioxide cladding 704, which is in turn surrounded by 1-µm-thick perfectly matched layer ("PML") 706 to absorb outgoing scattering waves. The waveguide is excited by TE polarized light at the input (point 708), and the frequency-domain full wave solutions are solved at the wavelength of $\lambda=1.55$ µm. It is worth noting that the wavelength parameter $\lambda$ does not appear in the theory of geometric phase, and is only set as required for frequency domain numerical simulation. The geometric origin of the polarization rotation implies that such rotation is independent of wavelength.

At the output (point 710), the waveguide mode is a mixture of the quasi-TE and quasi-TM eigenmodes. FIGS. 8A-8D show the contour maps of simulated electric fields $E_x$ and $E_y$ at the input and output of the silicon waveguide shown in FIG. 7, which is designed to generate a polarization rotation angle equal to 60°. The electric fields at the input and output are normalized individually, such that the maximum amplitude of the electric fields is equal to 1.

The polarization rotation angle can be extracted by expanding the hybrid mode using the fundamental quasi-TE and quasi-TM modes as shown by Eqn. (1).

$$\alpha_x = \tan^{-1}\left[\frac{\int\int E_{x,TM} E_x^* dxdy / \int\int |E_{x,TM}|^2 dxdy}{\int\int E_{x,TE} E_x^* dxdy / \int\int |E_{x,TE}|^2 dxdy}\right] \quad (1)$$

$$\alpha_y = \tan^{-1}\left[\frac{\int\int E_{y,TM} E_y^* dxdy / \int\int |E_{y,TM}|^2 dxdy}{\int\int E_{y,TE} E_y^* dxdy / \int\int |E_{y,TE}|^2 dxdy}\right]$$

where $E_{x,TE}$ and $E_{y,TE}$ are the transverse electric fields of the TE eigenmode, $E_{x,TM}$ and $E_{y,TM}$ are the transverse electric fields of the TM eigenmode, $E_x$ and $E_y$ are the transverse electric fields of the hybrid mode, $\alpha_x$ and $\alpha_y$ are the polarization rotation angles extracted using $E_x$ and $E_y$, respectively. The polarization rotation angles $\alpha_x$ and $\alpha_y$ extracted from FEM simulation results are plotted versus the design values at bending radius R=5, 10, and 20 µm respectively, in FIG. 9.

Figure 9:
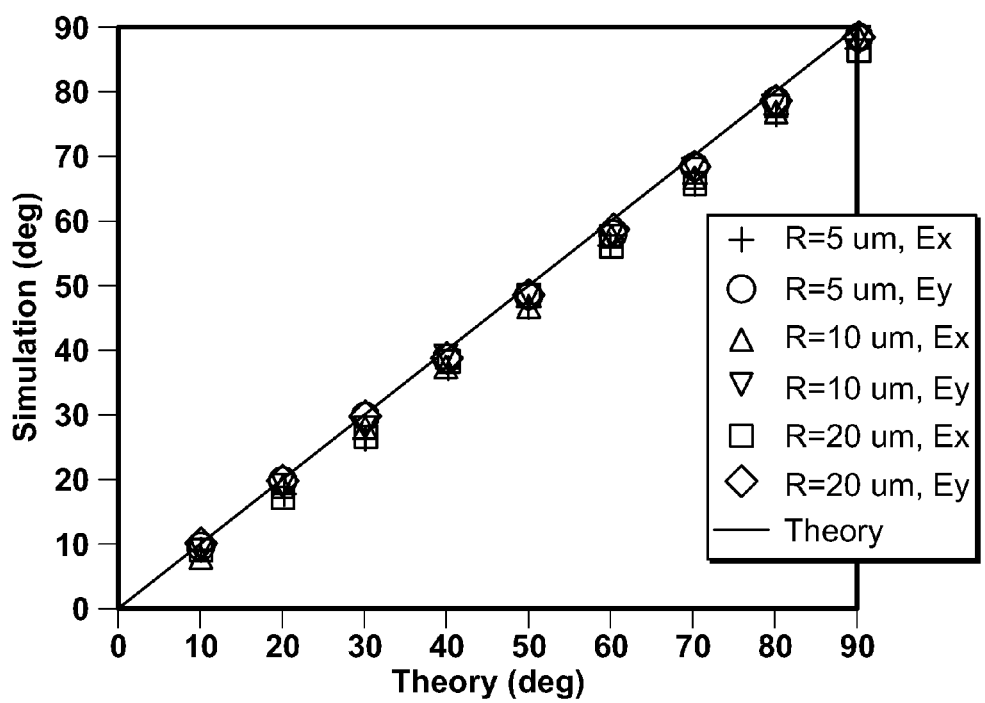
FIG. 9 is a graph illustrating simulated polarization rotation angles at bending radius equal to 5 μm, 10 μm, and 20 μm, and extracted using $E_x$ and $E_y$ components, plotted versus theory prediction.

As shown in FIG. 9, the simulation results are in good agreement with the theory prediction. The small difference between theory and simulation can be attributed to discretization error in the waveguide model, approximations from the numerical integration of Eqn. (1), and finite discretization in the finite element method simulation. No significant correlation between the polarization rotation and the bending radius is observed. Simulation results of silicon waveguides that have symmetric cross sections but different dimensions, for example 250 nm×250 nm, show similar results as that of the 300 nm×300 nm waveguide.

The polarization rotation based on geometric phase is different from the polarization rotation induced by birefringence in waveguide bends. In fabricated silicon waveguides, birefringence is inevitably induced by residual stress, slanted sidewalls, inhomogeneous cladding, and other factors. Analysis employing perturbation method and coupled-mode theory indicates that the TE-TM mode conversion induced by birefringence in waveguide bends varies with light wavelength, decreases rapidly with bending radius, and approaches zero for symmetric waveguide configuration. These characteristics clearly distinguish the polarization rotation based on geometric phase from that induced by birefringence in waveguide bends.

Figure 10A:
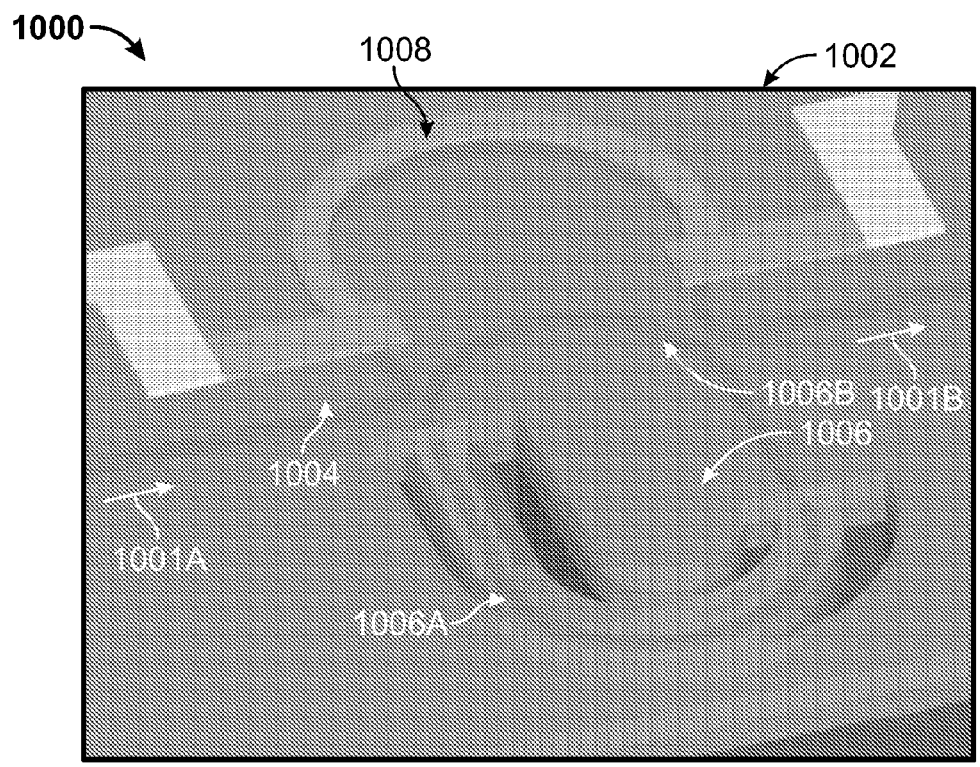
FIG. 10A is a schematic diagram of an optical polarization controller using a microring configuration.
Figure 10B:
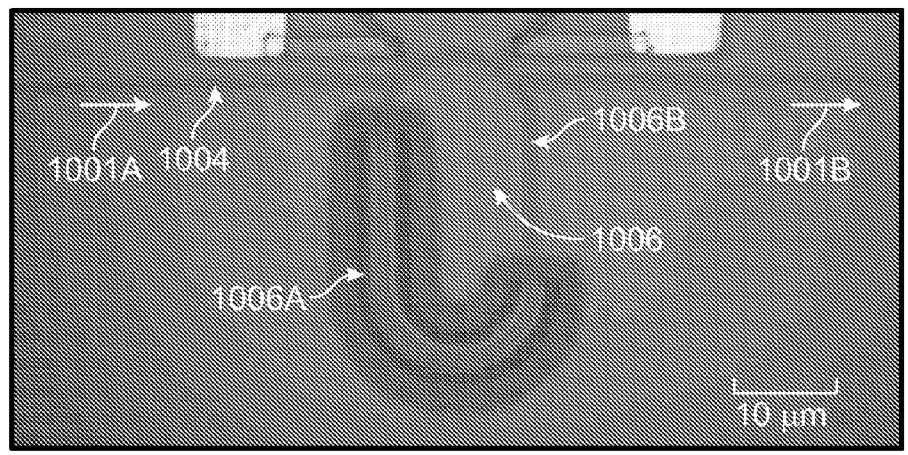
FIG. 10B is a top-down optical micrograph of the optical polarization controller shown in FIG. 10A.
Figure 10C:
FIG. 10C is an optical interferometric surface profilometry measurement of the microring shown in FIG. 10B showing an out-of-plane deflection of 1 μm.

Referring now to FIGS. 10A-10C, an optical polarization controller using a microring configuration is described. Berry's phase for tunable polarization rotation can be manifested by implementing an out-of-plane waveguide in a microring configuration that realizes a momentum-space with non-zero (Gaussian) curvature. In a single round trip of the microring, the polarization rotates by an angle determined by the out-of-plane deflection. On resonance, the polarization rotation is amplified by the increase in the effective path length. I. Golub, "Berry's phase amplification by a ring resonator", Opt. Lett. 31, 3342-3344 (2006). The overall polarization rotation can be controlled electrically by tuning the coupling coefficient of a bus waveguide coupled to the out-of-plane microring. An angle of optical polarization rotation between input and output light can therefore be a function of an effective path length of the microring. The example optical polarization controller using a microring configuration described herein demonstrates dynamic tuning between TE and TM modes in silicon strip waveguides with a 9 dB polarization extinction ratio.

Referring now to FIG. 10A, a schematic diagram of an optical polarization controller 1000 using a microring configuration is shown. The optical polarization controller 1000 can include a substantially planar substrate 1002, a bus waveguide 1004 formed on the substantially planar substrate 1002, a microring waveguide 1006 (also referred to herein as a "microring resonator") formed on the substantially planar substrate 1002 and optically coupled to the bus waveguide 1004, and a coupling controller 1008 that is configured to adjust an amount of optical coupling between the bus waveguide 1004 and the microring waveguide 1006. As shown in FIG. 10A, light can be input into the bus waveguide 1004 at coupling point 1001A, and light can be output from the bus waveguide 1004 at coupling point 1001B. Optionally, the light can be input/output to/from the bus waveguide 1004 through cantilever couplers, which are described in detail in U.S. Pat. No. 8,442,368 to Reano et al., entitled "Cantilever Couplers for Intra-Chip Coupling to Photonic Integrated Circuits." Similar as described above, the substantially planar substrate 1002 can optionally be a Si substrate. For example, the substantially planar substrate 1002 can optionally be a PIC chip as described above. In FIG. 10A, the cross-section of the silicon strip waveguides (i.e., the bus waveguide 1004 and the microring waveguide 1006) are 310 nm in width and 300 nm in height. Additionally, the radius of curvature of the curved section of the microring resonator 1006 is 20 µm and the straight sections are 40 µm in length. It should be understood, however, that these dimensions are provided only as examples and that other dimensions can be used.

At least a portion of the microring waveguide 1006 is designed to deflect out-of-plane, for example via thin film stress of the bilayer optical cladding, such that light propagation along the three-dimensional configuration in physical space results in a non-zero subtended solid angle in momentum space. For example, the microring waveguide 1006 can include a waveguide unit cell 1006A (e.g., the first and second out-of-plane waveguide portions 204A and 204B described with regard to FIG. 2A) and an in-plane waveguide portion 1006B (e.g., the in-plane waveguide portion 206 described above with regard to FIG. 2A). As described above, the first out-of-plane waveguide portion can be deflected either vertically up or down, and the second out-of-plane waveguide portion can be deflected the opposite direction as the first out-of-plane waveguide portion, e.g., either vertically down or up. As shown in FIG. 10A, the waveguide unit cell 1006A includes a first out-of-plane waveguide portion that forms a 180° bend and descends from a maximum height (e.g., the substantially planar substrate 1002) to a minimum height (e.g., spaced away from the substantially planar substrate 1002). Additionally, as shown in FIG. 10A, the waveguide unit cell 1006A includes a second out-of-plane waveguide portion that ascends from the minimum height (e.g., where it is coupled to the first out-of-plane waveguide portion) to the maximum height (e.g., the substantially planar substrate 1002). In other words, the microring waveguide 1006 can be formed by coupling the waveguide unit cell 1006A and the in-plane waveguide portion 1006B to form a microring resonator, for example, by connecting the in-plane waveguide portion 1006B between terminal ends of the waveguide unit cell 1006A. Example waveguide unit cells and in-plane waveguide portions are described in detail above and therefore are not described in further detail below.

Additionally, the microring waveguide 1006 is dual-coupled to the bus waveguide 1004 with the coupling controller 1008 as shown in FIG. 10A. It should be understood that optical coupling between the microring waveguide 1006 and the bus waveguide 1004 is affect by the distance, the coupling length and the refractive indices between the microring waveguide 1006 and the bus waveguide 1004. Optionally, the coupling controller 1008 can be configured to adjust the amount of optical coupling between the bus waveguide 1004 and the microring waveguide 1006 by at least one of an electrical, mechanical, thermal and optical excitation. For example, the coupling controller 1008 can be a micro-heater. The micro-heater can be configured to adjust the amount of optical coupling between the bus waveguide 1004 and the microring waveguide 1006 by adjusting a temperature of the bus waveguide 1004. It should be understood that the temperature of the bus waveguide 1004 is related to a refractive index of the bus waveguide 1004, which effects the amount of optical coupling between the bus waveguide 1004 and the microring waveguide 1006. Alternatively or additionally, the coupling controller 1008 can be at least one of a PIN junction, a PN junction, and a MOS capacitor. The PIN junction, PN junction, or MOS capacitor can be configured to adjust the amount of optical coupling between the bus waveguide 1004 and the microring waveguide 1006 by carrier injection, depletion, or accumulation. It should be understood that the amount of carriers is related to the refractive index and absorption of the bus waveguide, which effects the amount of optical coupling between the bus waveguide and the microring waveguide.

Referring to FIG. 10B, a top-down optical micrograph the optical polarization controller 1000 shown in FIG. 10A is shown, and referring to FIG. 10C an optical interferometric surface profilometry measurement of the microring 1006 shown in FIG. 10B showing an out-of-plane deflection of 1 µm is shown. The vertical deflection of the microring is observed to be 1 µm. The polarization rotator (e.g., the optical polarization controller 1000 shown in FIG. 10A) can be fabricated in the silicon-on-insulator material system with 1 µm of buried oxide. The silicon waveguides (e.g., the bus waveguide 1004 and the microring waveguide 1006 shown in FIG. 10A) can be fabricated using electron beam lithography and plasma etching. A top-cladding of PECVD oxide isolates the silicon waveguides from the microheater composed of Ti and Al. A subsequent electron beam lithography step and $SF_6$ plasma etch are conducted to simultaneously pattern the "J-shape" of the out-of-plane microring and cantilever couplers for fiber-to-chip light coupling. P. Sun and R. M. Reano, "Cantilever couplers for intra-chip coupling to silicon photonic integrated circuits", Opt. Express 17, 4565-4574 (2009).

The tunability of the polarization rotation based on Berry's phase is characterized by optical transmission measurements. Light from a continuous wave infrared laser source can be fiber coupled into the chip via cantilever couplers as described above while the tuning voltage is applied to the devices through integrated electrodes. An off-chip fiber polarization controller can be used to produce TE light that is input into the chip with a maximum TE/TM polarization extinction ratio, $P_{TE}/P_{TM}$, of 16 dB, where $P_{TE}$ is the optical power in the TE mode and $P_{TM}$ is the optical power in the TM mode. A 10 dB PER on-chip polarization splitter can be used to split the light in the output bus waveguide into a single waveguide TE output port and a single waveguide TM output port. D. Dai and J. E. Bowers, "Novel ultra-short and ultra-broadband polarization beam splitter based on a bent direction coupler," Opt. Express 19, 18614-18620 (2011). Cantilever couplers as describe above can be used to couple the light off chip via optical fiber where optical power is measured by photodetection.

Figure 11A:
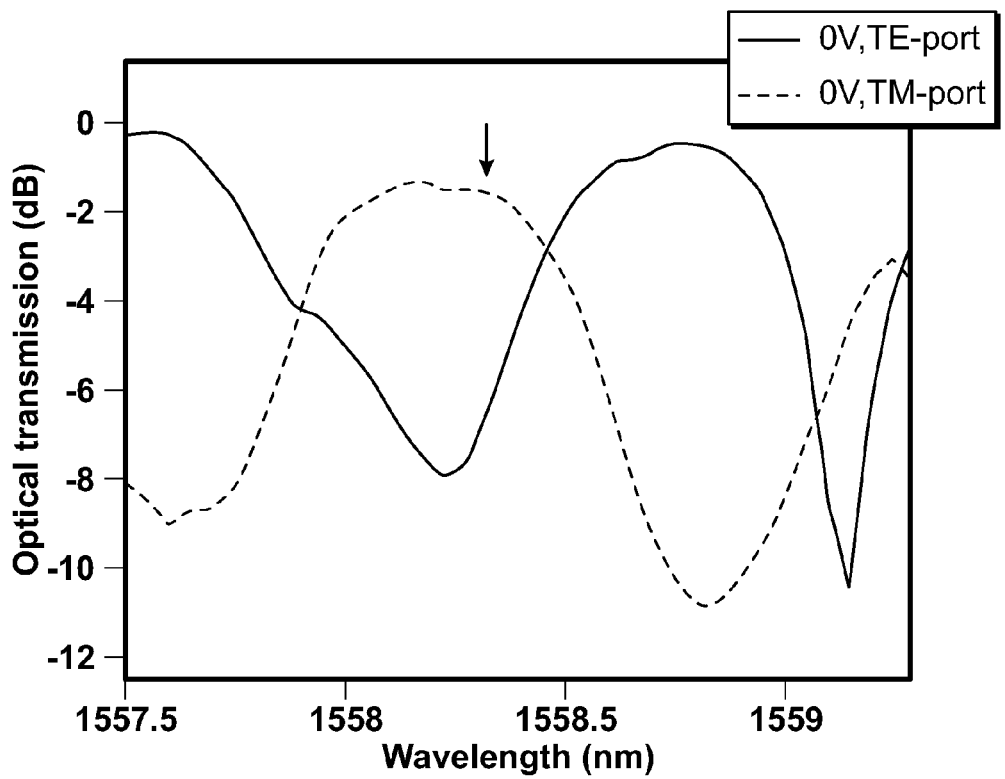
FIGS. 11A-11C are graphs illustrating measured optical transmission for the output TE polarization and the output TM polarization of the optical polarization controller shown in FIG. 10A. The input polarization is TE.
Figure 11B:
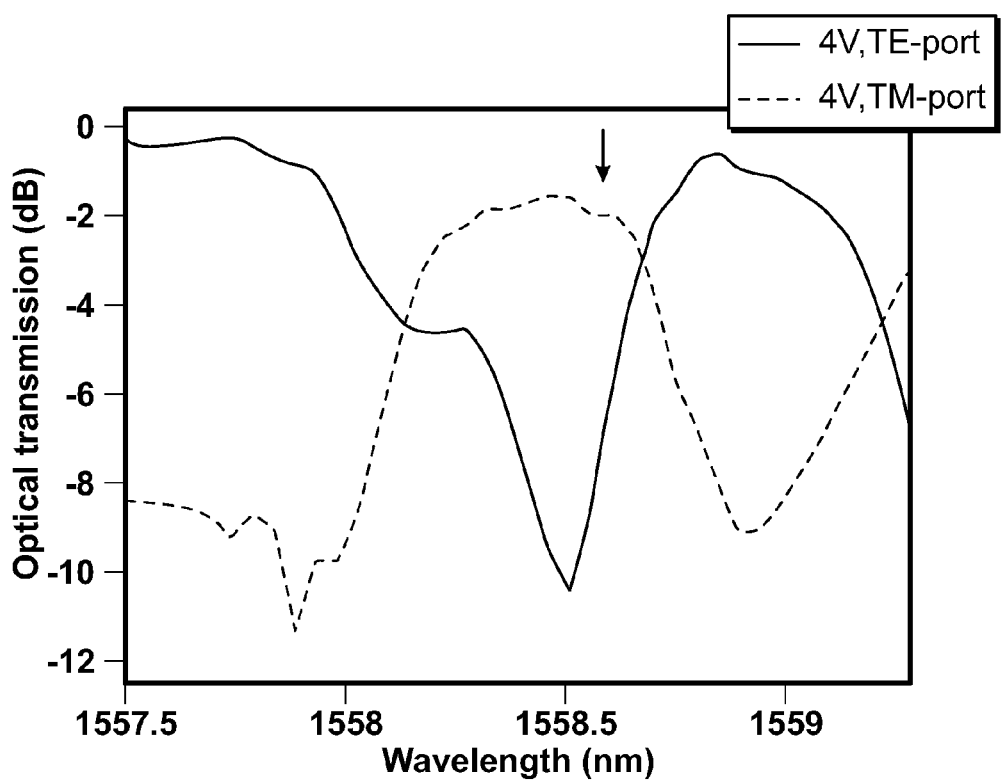
Figure 11C:
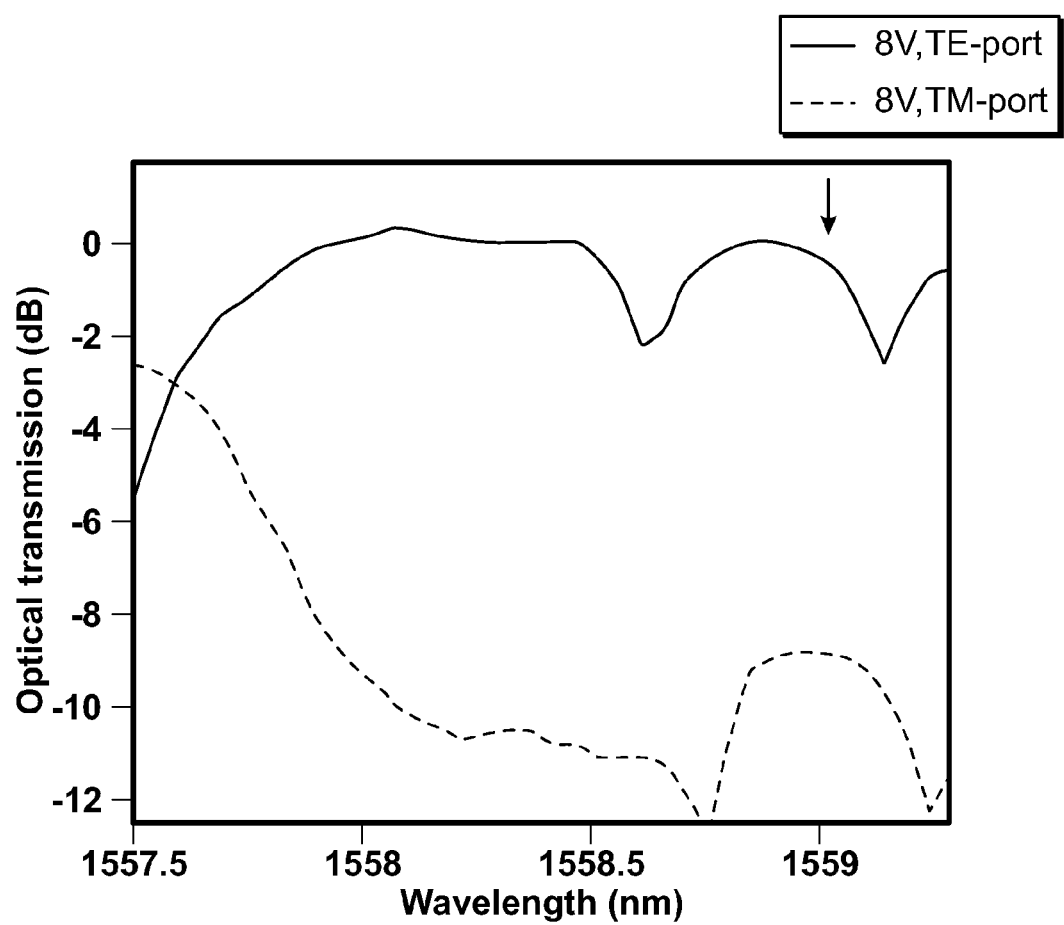

Referring now to FIGS. 11A-11C, graphs illustrating measured optical transmission for the output TE-polarization and the output TM-polarization of the optical polarization controller shown in FIG. 10A are shown as a function of wavelength and applied voltage. In FIG. 11A, a resonance for the TM mode in the microring is observed at 1558.2 nm for a tuning voltage of 0 V. The polarization extinction ratio is observed to be −6 dB with most of the output power in the TM mode. Increasing the voltage to 4 V results in the measurements shown in FIG. 11B. Here, the resonance has red-shifted slightly to 1558.5 nm due to thermal proximity of the microheater. The measured PER has increased to a maximum negative value of −9 dB. FIG. 11C shows the results for the DC bias increased to 8 V. The resonance has shifted again slightly to 1558.9 nm due to the microheater. The measured PER is seen to switch to +9 dB, indicating that most of the power resides in the TE mode. Analysis of the structure by coupled mode theory shows that the transmission response can be characterized by a specific bus-ring coupling coefficient, denoted $y_\theta$, that is a function of the out-of-plane deflection angle, denoted θ. Here, the bus-ring coupling coefficient, denoted y, is controlled experimentally with the microheater power. When $y<y_\theta$, the transmission response is characterized by a TM resonance peak as observed in FIG. 11A. When $y=y_\theta$, the transmission response is characterized by maximum TM-to-TE power as shown in FIG. 11B. Finally, when $y>y_\theta$, the transmission response is characterized by a double peak in the TE power as observed in FIG. 11C. Comparing FIGS. 11B and 11C, the demonstrated conversion loss is 1.4 dB.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An optical polarization controller, comprising:
   a substantially planar substrate; and
   a waveguide unit cell formed on the substantially planar substrate, the waveguide unit cell comprising:
   a first out-of-plane waveguide portion, and
   a second out-of-plane waveguide portion coupled to the first out-of-plane waveguide portion, wherein each of the first and second out-of-plane waveguide portions respectively includes a core material layer arranged between a first optical cladding layer having a first stress-response property and a second optical cladding layer having a second stress-response property that is different than the first stress-response property such that each of the first and second out-of-plane waveguide portions is deflected by a deflection angle, wherein the deflection angle of at least one of the first out-of-plane waveguide portion or the second out-of-plane waveguide portion is configured to be adjustable in response to an electrical excitation, and wherein the at least one of the first out-of-plane waveguide portion or the second out-of-plane waveguide portion further comprises a piezoelectric actuator layer provided on the first or second optical cladding layers, the piezoelectric actuator layer being configured to expand or contract in response to an applied electric field.

2. The optical polarization controller of claim 1, wherein at least one of the first out-of-plane waveguide portion or the second out-of-plane waveguide portion is deflected toward or away from the substantially planar substrate.

3. The optical polarization controller of claim 1, wherein an angle of optical polarization rotation between input and output light is a function of the deflection angle.

4. The optical polarization controller of claim 1, further comprising a plurality of waveguide unit cells coupled in series and formed on the substantially planar substrate, wherein an angle of optical polarization rotation between input and output light is a function of a number of the waveguide unit cells and the deflection angle.

5. The optical polarization controller of claim 4, further comprising one or more in-plane waveguide portions, wherein each respective in-plane waveguide portion is connected between two waveguide unit cells.

6. The optical polarization controller of claim 1, wherein, in response to the applied electric field, the deflection angle of the at least one of the first out-of-plane waveguide portion or the second out-of-plane waveguide portion is adjusted.

7. The optical polarization controller of claim 1, wherein the piezoelectric actuator layer is a thin film formed from a piezoelectric material.

8. The optical polarization controller of claim 1, wherein:
   the core material layer is formed from at least one of a semiconductor, a polymer, an amorphous glass, crystal, or a chalcogenide, or
   the first optical cladding layer is formed from at least one of PECVD $SiO_2$ or BOX $SiO_2$, or
   the second optical cladding layer is formed from at least one of PECVD $SiO_2$ or BOX $SiO_2$.

9. An photonic integrated circuit (PIC) chip, comprising:
   a substantially planar substrate;
   electronic and photonic circuitry formed on the substantially planar substrate; and
   the optical polarization controller of claim 1 formed on the substantially planar substrate and electrically and photonically coupled to the electronic and photonic circuitry.

* * * * *